(12) United States Patent
Galin et al.

(10) Patent No.: US 10,587,118 B2
(45) Date of Patent: Mar. 10, 2020

(54) SMART OUTLET

(71) Applicant: Solaredge Technologies Ltd., Herzeliya (IL)

(72) Inventors: Yoav Galin, Raanana (IL); Guy Sella, Bitan Aharon (IL); Ilan Yoscovich, Ramat Gan (IL); Amir Fishelov, Tel Aviv (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 15/812,279

(22) Filed: Nov. 14, 2017

(65) Prior Publication Data
US 2018/0226797 A1 Aug. 9, 2018

Related U.S. Application Data

(60) Provisional application No. 62/422,273, filed on Nov. 15, 2016.

(51) Int. Cl.
| | |
|---|---|
| *F16P 3/20* | (2006.01) |
| *H02J 3/14* | (2006.01) |
| *H02J 1/00* | (2006.01) |
| *G05F 1/66* | (2006.01) |
| *G05F 1/625* | (2006.01) |
| *H02J 3/38* | (2006.01) |
| *H01R 13/66* | (2006.01) |

(52) U.S. Cl.
CPC ............. *H02J 3/14* (2013.01); *G05F 1/625* (2013.01); *G05F 1/66* (2013.01); *H02J 1/00* (2013.01); *H02J 3/383* (2013.01); *H01R 13/66* (2013.01); *Y02B 70/3225* (2013.01); *Y02E 10/563* (2013.01); *Y04S 20/222* (2013.01)

(58) Field of Classification Search
CPC ... H01R 13/66; H02J 3/383; H02J 3/14; H02J 1/00; Y04S 20/222; G05F 1/625; G05F 1/66; Y02B 70/3225; Y02E 10/563
See application file for complete search history.

(56) References Cited

U.S. PATENT DOCUMENTS

| | | | |
|---|---|---|---|
| 9,172,245 B1 | 10/2015 | Lentine et al. | |
| 2011/0308765 A1* | 12/2011 | Kumar | B60L 11/1874 165/47 |
| 2012/0080942 A1 | 4/2012 | Carralero et al. | |
| 2012/0166008 A1 | 6/2012 | Jeong | |

(Continued)

FOREIGN PATENT DOCUMENTS

EP    2869423 A1    5/2015

OTHER PUBLICATIONS

Apr. 19, 2018—EP Search Report EP App 17201769.1.

*Primary Examiner* — Alfonso Perez Borroto
*Assistant Examiner* — Esayas G Yeshaw
(74) *Attorney, Agent, or Firm* — Banner & Witcoff, Ltd.

(57) ABSTRACT

Various implementations described herein are directed to systems, apparatuses and methods for managing one or more loads connected to one or more power sources using one or more smart outlets. Apparatuses described herein may include smart outlets configured to communicate with one or more controllers and responsively connect and disconnect electrical loads connected thereto. Methods described herein may include signaling and/or controlling one or more loads from a group of loads to connect to or disconnect from one or more power sources.

12 Claims, 26 Drawing Sheets

(56) References Cited

U.S. PATENT DOCUMENTS

| | | |
|---|---|---|
| 2014/0088780 A1 | 3/2014 | Chen |
| 2016/0141879 A1* | 5/2016 | Motsenbocker .......... G05F 1/67 |
| | | 307/18 |
| 2016/0329713 A1* | 11/2016 | Berard ...................... H02J 3/24 |
| 2017/0054299 A1* | 2/2017 | Gilbert ...................... H02J 3/14 |
| 2017/0331325 A1* | 11/2017 | Ristau ....................... H02J 3/14 |
| 2018/0034280 A1* | 2/2018 | Pedersen ................... H02J 5/00 |

* cited by examiner

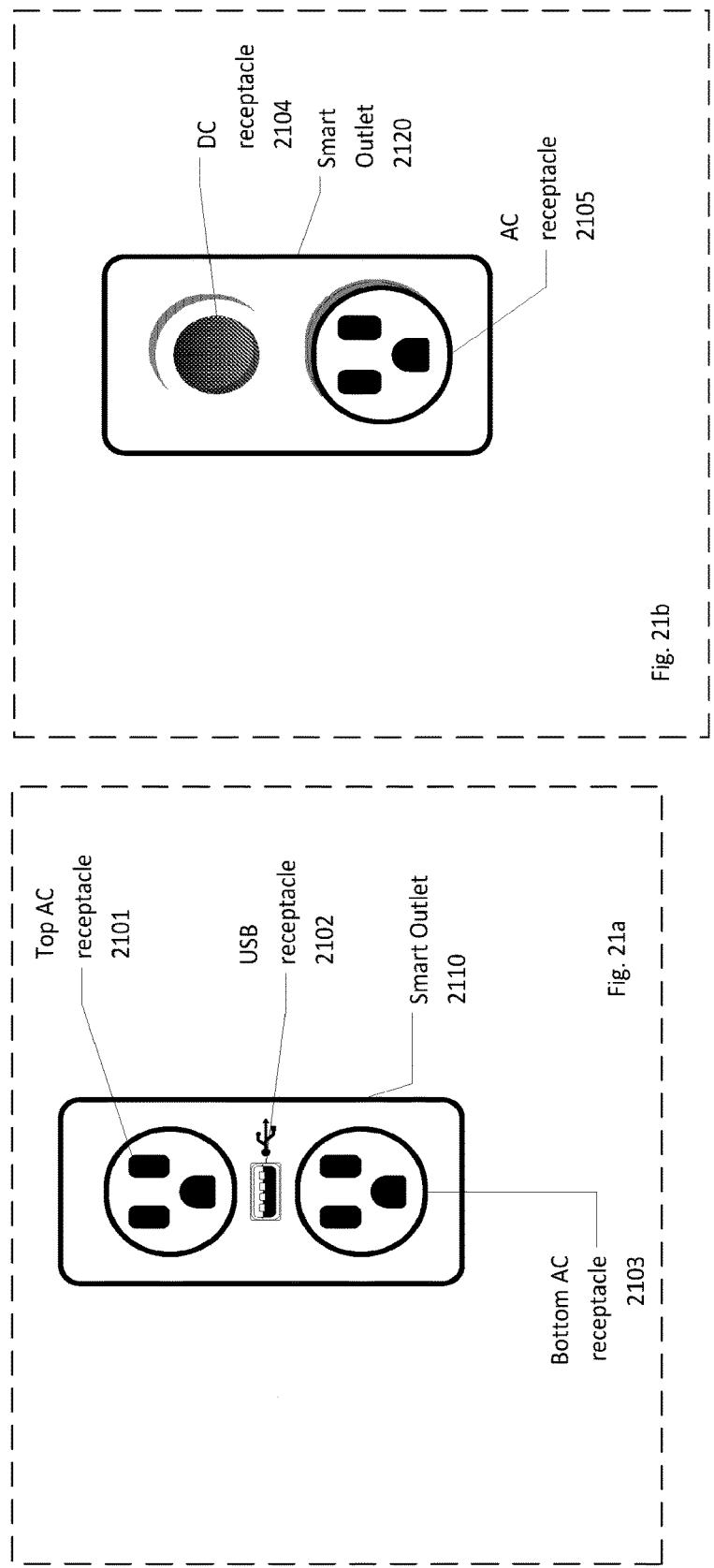

SMART OUTLET

CROSS-REFERENCE RELATED APPLICATIONS

The present application claims the priority benefit of U.S. Provisional Patent Application No. 62/422,273, filed Nov. 15, 2016, entitled Smart Outlet. The patent application listed in this paragraph is hereby incorporated by reference in its entirety.

BACKGROUND

Some electrical systems include a group of loads and an input power source that at times might not supply enough power to meet the total power demand by the group of loads. In another case, some electrical networks include a group of loads and more than one power source, and if one or more power source(s) disconnect, there may be a risk that the power that is supplied by the remaining power source(s) might not meet the total power demand of the loads in the electrical network.

For example, a user's premises (e.g. a house or office) may be connected to a main power grid as well as to an alternative power source, such as a backup storage device (such as a battery, flywheel, capacitor and/or supercapacitor) or a renewable energy system. When there is an event such as a power outage in the main grid, or any other emergency situation which interrupts the power supplied by the main grid, there may be a risk that the system may produce less power than the electrical appliances require. In such a system, it may be critical for certain appliances to remain powered. For example, in a house or office it may be critical that a life support system, refrigerator, or security cameras will continue working during such an event, while a treadmill, a television or a microwave may be disconnected to save power depending on the user's priorities.

Accordingly, there may be a need for a system of smart prioritized power distribution amongst several loads.

SUMMARY

The following summary is for illustrative purposes only, and is not intended to limit or constrain the detailed description.

Features disclosed herein may include methods for disconnecting loads according to priority labels at times where there may be less power available than the total power associated by the loads (e.g. required by the loads), or when there may be other considerations that need to be taken into account such as energetic or financial limitations.

Instead of using the term "subscriber's premises," description of features may use examples such as a house or an office. In all cases these examples are to be non-limiting, and they may be replaced with any other premises.

Features disclosed herein may employ methods and apparatuses for switching of electrical loads according to one or more of priority labels, available power, available energy, cost and/or power demand.

Illustrative features may include use of a "Smart Outlet," e.g. an electrical outlet with communication and/or control capabilities, configured to connect and disconnect loads from the electrical power supply provided by the electrical outlet.

In illustrative electrical systems, a group of electrical loads may be electrically connected or connectable to one or more electrical power sources. For example, a home comprising dozens of electrical appliances may be connected or connectable to an electrical grid in addition to one or more alternative power sources (e.g. photovoltaic source(s), storage device(s), battery(ies), windmill(s), fuel cell(s), flywheel(s), etc.). The alternative power sources may serve as auxiliary power supplies that reduce the power consumed form the electrical grid. Additionally, or alternatively, the alternative power sources may serve as backup supplies that ensure continuous supply of power to the electrical loads during a grid outage.

Photovoltaic (PV) sources and PV generators referred to within one or more features may be PV cell(s), PV string(s), PV substring(s), PV panel(s), PV array(s) of panels and/or PV shingles.

Power converters and/or converters referred to within one or more features may be inverters, microinverters, a charge-pump converter, AC/DC converters and/or DC/DC converters.

According to features of the disclosure herein, the power that may be generated from the input power sources may be less than the power that may be needed to operate the electrical loads that may be connected to the electrical network. In this case, there might be a risk that some or all of the loads might not work properly. Disconnecting one or more of the loads from the electrical network according to priority labels may reduce the total power demand from the loads, and allow the rest of the loads that may be still connected to the electrical network to receive enough power to work properly.

According to features of the disclosure herein, the power generated by the power sources may be sufficient to support the power needed to operate all the electrical loads that may be connected to the electrical network for a limited time. In this case, there might be a risk that after this limited time, one or more of the loads might not work properly. Disconnecting one or more of the loads from the electrical network may reduce the total power demanded by loads, thereby reducing the rate of energy drawn from the power sources and prolonging the period of time for which the power sources may properly provide power to critical loads.

According to features of the disclosure herein, the power generated by the power sources may be sufficient to support the power needed to operate all or most of the electrical loads that may be connected to the electrical network, but the price of energy may be high for a certain period of time. For example, some utility grids feature dynamic pricing models, in which the cost of drawing electricity from the grid may be variable over the course of the day. In this case, one may wish to reduce the power consumed from the power sources until the price is reduced. Disconnecting some of the loads from the electrical network may reduce the total power demand from the loads, and perhaps reduce the cost of power during the period of time when energy has a high price.

Some features may be subject to some or all of the limitations mentioned above, i.e. insufficient power, insufficient energy and/or high cost.

According to features of the disclosure herein, the decision of which loads to connect to the electrical network and which loads to disconnect may be made according to priority labels that may be assigned to each load or group of loads. According to features of the disclosure herein, high-priority loads may be disconnected if the loads with lower priority may be already disconnected.

According to features of the disclosure herein, a user may manually set the priority of each load or group of loads according to user preference, and according to features of the disclosure herein, setting priorities may be an automatic process carried out by a computer that may be programmed to set the priorities.

For example, power sources may supply electrical power to loads, and in case of insufficient power generation (i.e. when the loads may require more power than that may be produced by the power sources), some loads may be disconnected in order to reduce the power required by the loads to ensure that at least some of the loads may work properly.

According to features of the disclosure herein, communication between different elements of the electrical network may be supported to allow the sharing of information in order to optimize the management of the loads. A system management unit may communicate with a switching circuit to control the connecting and disconnecting of loads. According to features of the disclosure herein, the system management unit may communicate directly with the loads for updating priorities. Communication may be carried out via numerous methods (e.g. Power Line Communication, or other wired or wireless communication methods).

Power sources referred to within one or more of the features may include main power grids, micro power grids, batteries, fuel cells, renewable energy sources (such as photo voltaic systems, wind turbines, water turbines etc.), and any other system with a purpose or an outcome of generating electrical power. In almost all cases it may be possible to replace one source with another. Therefore, though one type of power source may be given as an example in each feature, the feature may include each of these aforementioned power sources.

Electrical connections referred to within one or more of the features may vary among outlets, inlets, plugs, sockets, wires, transformers or any other device with the purpose of enabling the flow of electrical power through it.

Switches referred to within one or more of the features may be devices that have two or more terminals and may allow or block electrical current flowing from one terminal to the others. In the case of a switch with only two terminals, turning a switch "on" results in the switch allowing electrical current to flow from one terminal to the other, and turning a switch "off" results in the switch blocking the flow of electrical current from one terminal to the other. It is understood that one of ordinary skill in the art may slightly modify methods disclosed herein to reverse this definition. Such modified methods are within the scope of the features disclosed herein.

Switching circuits and control thereof may be designed for rapid and efficient switching of loads between power sources according to illustrative features. Some features may include switching circuits comprising one or more parallel-connected switching devices. For example, an illustrative single-pole-multi-throw (SPMT) switch may be implemented using multiple parallel-connected branches. Each branch may include a transistor (e.g. MOSFET—Metal Oxide Semiconductor Field Effect Transistor, or IGBT—Insulated Gate Bipolar Transistor) in parallel to an electromechanical relay. The relay may provide low steady-state resistance and the transistor may provide a fast switching response and limit the voltage drop over the relay during switching.

In some illustrative features, electrical distribution boards may include one or more integrated switching circuits for connecting one or more subsidiary circuits of the distribution board to a selected power source of one or more power sources. According to features of the disclosure herein, distribution boards may be originally designed including switching circuits for connecting subsidiary circuits to different power sources. According to features of the disclosure herein, a switching circuit may be retrofit to an existing distribution board to add a functionality of switching loads.

To facilitate smooth switching of a load from one power source to another, features may include synchronizing power source voltages to avoid providing a load with a supply voltage signal featuring discontinuities. For example, according to features of the disclosure herein, a power converter converting direct current (DC) power from a DC power source to alternating current (AC) power may be synchronized with an electrical grid and configured to output an AC voltage of the same magnitude, frequency and phase as the grid.

Further features include user interfaces for monitoring load division in some power systems. A system owner or operator may be able to view a list of system loads, power sources, switches and priorities with a mapping between loads, switches, priorities and power sources. According to features of the disclosure herein, the list may be a graphical user interface (GUI) viewable on a computing device, such as a computer monitor, tablet, smart-television, smartphone, or the like. According to features of the disclosure herein, the system operator may be able to manually set the priority of switches through the GUI (e.g. by pressing buttons or touching a touchscreen).

As noted above, this Summary is merely a summary of some of the features described herein and is provided to introduce a selection of concepts in a simplified form that are further described below in the Detailed Description. The Summary is not exhaustive, is not intended to identify key features or essential features of the claimed subject matter and is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIGS. 21a and 21b illustrate examples of designs of a dual smart outlet according to illustrative features.

DETAILED DESCRIPTION

In the following description of various illustrative features, reference is made to the accompanying drawings, which form a part hereof, and in which is shown, by way of illustration, various features in which aspects of the disclosure may be practiced. It is to be understood that other features may be utilized and structural and functional modifications may be made, without departing from the scope of the present disclosure.

For clarity and reduction of visual noise, many of the figures disclosed herein feature single-line electrical connections where multi-line connections would normally be used. It is to be understood that some single-line electrical connections would be implemented, according to features of the disclosure herein, as two lines (e.g. a direct-current (DC) positive line and a direct-current (DC) negative/ground line) or three or more lines (e.g. some three-phase alternating-current (AC) systems feature three lines, and some include a fourth, "neutral" line).

Electrical power may be defined as the amount of energy consumed or produced per time unit. The integral of the electrical power supplied by a power source over a specific time interval may be defined as the energy supplied by the power source in that time interval. Some electrical power sources may have limited power, meaning they have a limit on the rate of energy they may supply. Other electrical power sources may have limited energy, meaning they might not supply power for infinite time. Some power sources may have a combination of both limitations.

According to features of the disclosure herein, the main power grid may be a smart grid, supporting time-based pricing programs or dynamic pricing programs that use real-time or day-ahead hourly electricity rates. For example the price of watt-hour may be broadcasted over the grid, and a system-control device may react accordingly by reducing the power demand of the local electrical network when the price may be high or over a threshold price. One possible way to implement this may be by assuming there may be information received from the main power grid regarding the current price of watt-hour. A threshold may be set for the price of watt-hour. When above said threshold, the system-control device reacts as described for a power outage, achieving a smaller power demand. The threshold may change dynamically over time according to user preference.

According to features of the disclosure herein, where PLC may be implemented, there may be a use of multiple frequency bands for PLC. The controllers or the communication devices may choose a frequency band with a good SNR. This may help overcoming low SNR issues.

According to features of the disclosure herein, where PLC may be implemented, a filter may be added to filter out the noise in the frequencies used for PLC. This may improve the SNR.

Figure 1:
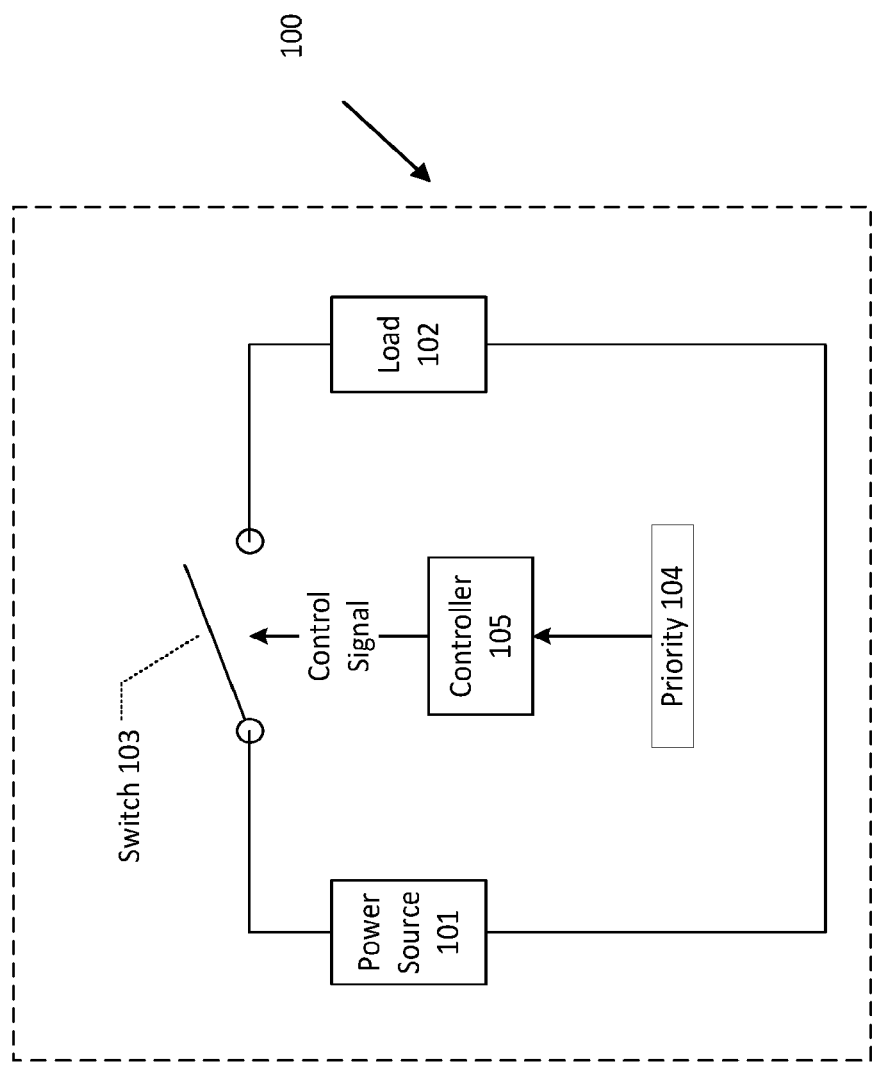
FIG. 1 illustrates an electric circuit with a switch that depends on priority according to illustrative features.

Reference is now made to FIG. 1, which illustrates an electrical network 100 comprising input power source 101, electrical load 102, switch 103 (e.g. relay, IGBT, MOSFET), controller 105 and priority label 104. Priority label 104 may be associated with load 102 or with switch 103. Priority label 104 may be readable by controller 105. Power source 101 may be a DC power source or an AC power source. Switch 103 may be "on" or "off" according to priority label 104. In order for load 102 to work properly, the power available from power source 101 should meet the power demand from load 102. As long as the power demand from load 102 may be maintained lower than or equal to the power available from power source 101 the load may work properly. If the power available from power source 101 may be smaller than the power demand from load 102, load 102 might not work, or may work with deteriorated or impaired performance.

A controller (e.g. controller 105 of FIG. 1) may be realized on different platforms, e.g. an analog circuit, microprocessor, Digital Signal Processor (DSP), Field Programmable Gate Array (FPGA), Application Specific Integrated Circuit (ASIC) or other suitable devices. In features where one of the power sources may be a photovoltaic (PV) system comprising a power converter such as an inverter, a controller may be located in a power converter which may be a part of the PV system, or may be located in a different location in the premises with communication to the power converter.

According to features of the disclosure herein, a controller may have a memory storing a software for managing the controller operations and user interface, and it may be desirable to periodically update the software of the controller (e.g. controller 105 discussed above, main controller 803 and/or controller 802a of FIG. 8, discussed below, and/or controller 501 of FIG. 5, discussed below, etc.). The software may operate the controller e.g. turning "on" and "off" switches, take measurements, send/receive information to other controllers, and/or manage a graphical user interface (GUI) to interact with a user. If there might not be a connection to an external network, a user may update the software manually. In systems that include multiple controllers, including a main controller (discussed below in reference to FIG. 4), the main controller may be connected the internet. A manufacturer or the provider may remotely update the software of the main controller via the internet. Main controller may then send software updates to other controllers via one or more communication lines (also discussed below in reference to FIG. 4). According to features of the disclosure herein, it may be possible to connect each of the controllers to the internet. In one scenario, connecting the controllers to the internet may eliminate the need for a main controller, thus simplifying the system.

According to features of the disclosure herein, controller 105 may be equipped with sensors that enable it to measure total harmonic distortion (THD) Controller 105 may be configured to disconnect switch 103 if it detects high THD. The THD may be defined as the ratio of the sum of the powers of the harmonic components to the power of the fundamental frequency.

Controller 105 may control switch 103. It may set switch 103 to be "on," i.e. allowing electrical current to flow from one terminal of switch 103 to the other terminal, or it may set switch 103 to be "off," i.e. blocking electrical current from flowing through switch 103. Controller 105 may control switch 103 according the priority label 104. Priority label 104 may be defined by a user according to the user preference, and it may be read by controller 105. Priority label 104 may be stored in the memory of controller 105.

Figure 2:
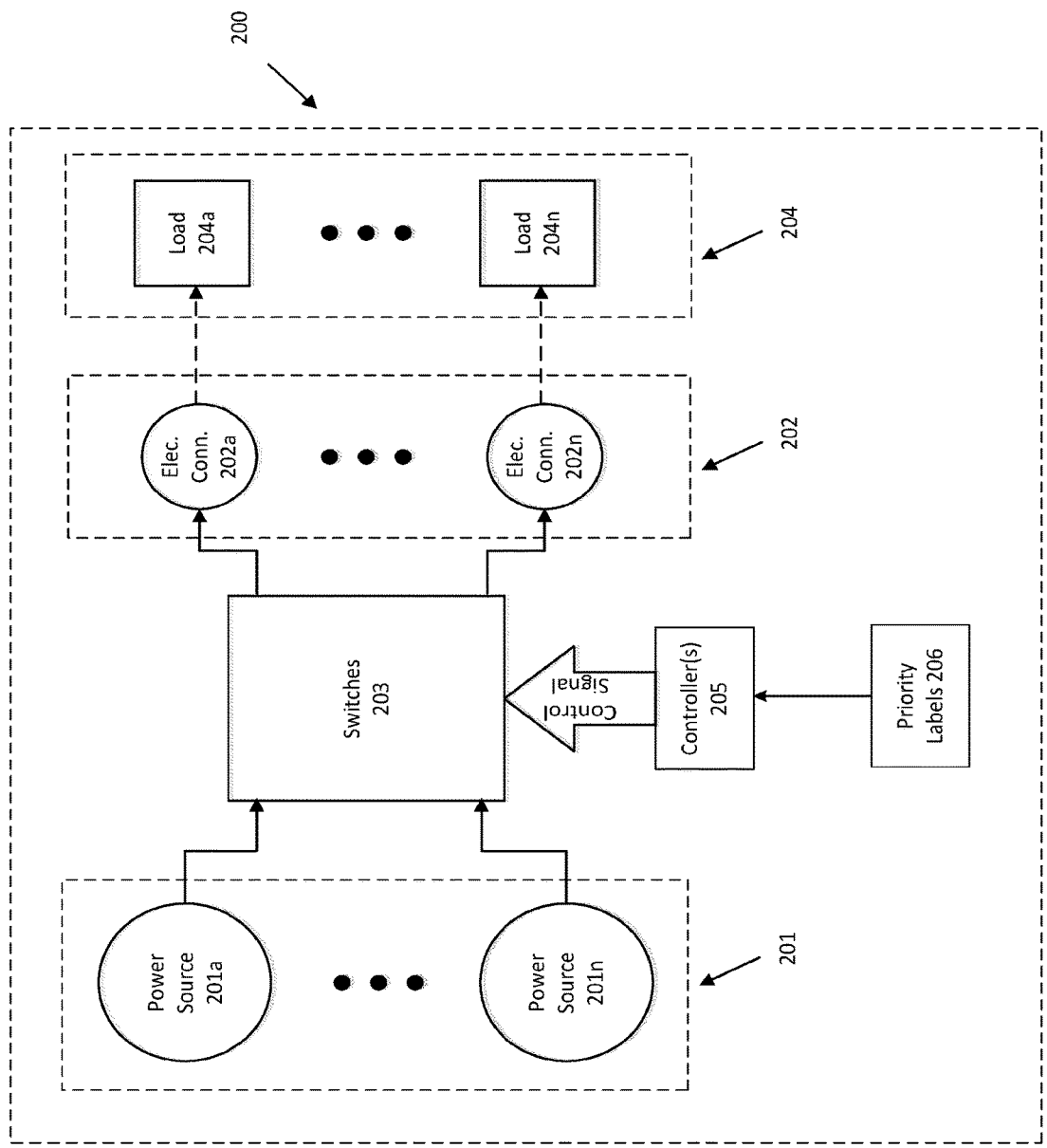
FIG. 2 illustrates an electrical network according to illustrative features.

Reference is now made to FIG. 2, which illustrates electrical network 200. Electrical network 200 comprises power source(s) 201a . . . 201n, collectively referred to as "power sources 201," load(s) 204a . . . 204n, collectively referred to as "loads 204," electrical connection(s) 202a . . . 202n, collectively referred to as "electrical connections 202," switches 203, controller(s) 205 and priority labels 206. Electrical network 200 may receive power from power sources 201, and transfer the power to loads 204 via electrical connections 202. Switches 203 may have the capability of disconnecting and connecting one or more loads of loads 204 from power sources 201. By disconnecting one or more loads of loads 204 from power sources 201, the total power demand of loads 204 may be reduced, thus potentially enabling other connected loads to receive more power. For example, if the power generation capacity of power sources 201 is limited, and the power demand of the connected loads of loads 204 may be above the limit, then disconnecting one or more connected loads of loads 204 may lead to a smaller demand of power, such that the available power from power sources 201 may satisfy the demand.

Disconnecting a load (e.g. load 204a) from electrical network 200 may be executed by changing the state of one or more switches of switches 203. According to features of the disclosure herein, connecting and disconnecting a load from an electrical network may involve changing the state of one switch, or changing the state of more than one switch. Controller(s) 205 may set switches 203 to on/off positions in such a way that the load may be disconnected from electrical network 200.

Controller(s) 205 may control the disconnecting and connecting of loads 204 according to one or more rules or criteria. According to features of the disclosure herein, a priority-based rule may be used. For example, a priority label may be assigned to each load or group of loads. According to features of the disclosure herein, each load receives its own priority label, and According to features of the disclosure herein, a priority label may be shared by multiple loads. Each load (or corresponding switch) may then be managed according to the priority label assigned to that load.

Assignment of priority labels may be variously implemented. According to features of the disclosure herein, each load may include a readable memory device, with the load's priority label stored on the device. According to features of the disclosure herein, each load may further have a communication circuit for communicating its priority label to a controller. According to features of the disclosure herein, controller(s) 205 may have a memory device holding a lookup table, where the priority label of each connected load may be stored. Electrical connections 202a-202n may link loads 204 to switches 203, such that individual loads may be connected and disconnected to power sources 201 by switches 203.

According to features of the disclosure herein, two elements may be comparable. For example, two elements x and y may be comparable if the elements are of a set that is partially ordered by a binary relation ≤ are comparable when either x≤y or y≤x.

Controller(s) 205 may control the switching of switches 203 according to a priority switching method. Priority switching may be based on one or more variables. The variables may be defined as follows:

$a_i$=the $i^{th}$ switch. The value of i may be between 1 and the number of switches.

$p(a_i)$=the priority label attributed to

"on"=the electrical connections that may be controlled by the switch are connected to one or more power sources.

"off"=the electrical connections that may be controlled by the switch are disconnected from power sources.

Given that $p(a_i)$ are comparable for every i, the following condition must be met under priority switching:

For every j and k, if $p(a_k)$ $p(a_j)$ then $a_k$ may be switched "off" only if $a_j$ is switched "off", and $a_j$ may be switched "on" only if $a_k$ is switched "on".

The direction of the inequality sign in the condition may be reversed according to the order of the priority labels (descending or ascending). For example according to the above condition, the switch or group of switches with the highest priority label may be switched "off" last, and the switch or group of switches with the lowest priority label may be switched "off" first. When reversing the direction of the inequality, the switch or group of switches with the highest priority label may be switched "off" first, and the switch or group of switches with the lowest priority label may be switched "off" last.

According to features of the disclosure herein, the value of the priority label may be stored in a memory device (e.g. non-volatile or volatile memory, magnetic memory, read-only memory, flash, etc.) that may be a part of the controller or an external memory device that may be added to the controller. A user or a software service may change the value of the priority by writing to the memory device the desired value for the priority label. In other features, wherein the user sets the priority manually, the priority label may be stored in a physical switch (e.g. toggle switch, slide switch, rotary code switch, multi-pole multi-throw switch).

According to features of the disclosure herein, it may be desired to have a dynamic priority label that matches the operation or current state of the load. For example, a PC monitor may be set to high priority when on, and set to low priority when in standby mode. In a first example, this may be implemented using a smart load that may communicate with a Smart Outlet and disclose information about its operation. In a second example, this may be implemented using one or more methods for estimating the operation of the load.

According to features of the disclosure herein, the priority labels (e.g. priority labels 206 of FIG. 2) may belong to a set of two values. Referring again to FIG. 2, the system illustrated comprises one or more power sources 201a-201n, electrical loads 204a-204n, and an electrical network of switches 203 that may connect power sources 201a-201b to loads 204a-204n. Each switch of switches 203 may be associated with a priority label of priority labels 206. Each priority label of priority labels 206 may be assigned one of two possible values. These possible values may indicate a first priority or a second priority label, wherein the first priority label is higher than the second priority label.

Controller(s) 205 may control switches 203 according to one or more of the total available power and energy from power sources 201, the power demand associated with loads 204, and the priority labels 206. For example, controller(s) 205 may regulate the power demand associated with connected loads 204. In one scenario, the available power from power sources 201 may be 20 kW, and loads 204 may comprise eight (8) loads, wherein each load may require 3 kW. In this scenario, the total power demand of loads 204 is then 24 kW. The total power demand by loads 204 (24 kW) is higher than the total power provided by power sources 201 (20 kW). Controller(s) 205 may change the state of one or more switches of switches 203 such that one or more loads of loads 204 with the lowest priorities may be disconnected from power sources 201. For example, load 204a and load 204n may have the lowest priorities, and may be disconnected from power sources 201. Assuming that load 204a and load 204n each have a load of 3 kW, the total power demand after loads 204a and 204n are disconnected is 18 kW, which may be satisfied by power sources 201 (which has 20 kW of available power).

Figure 3A:
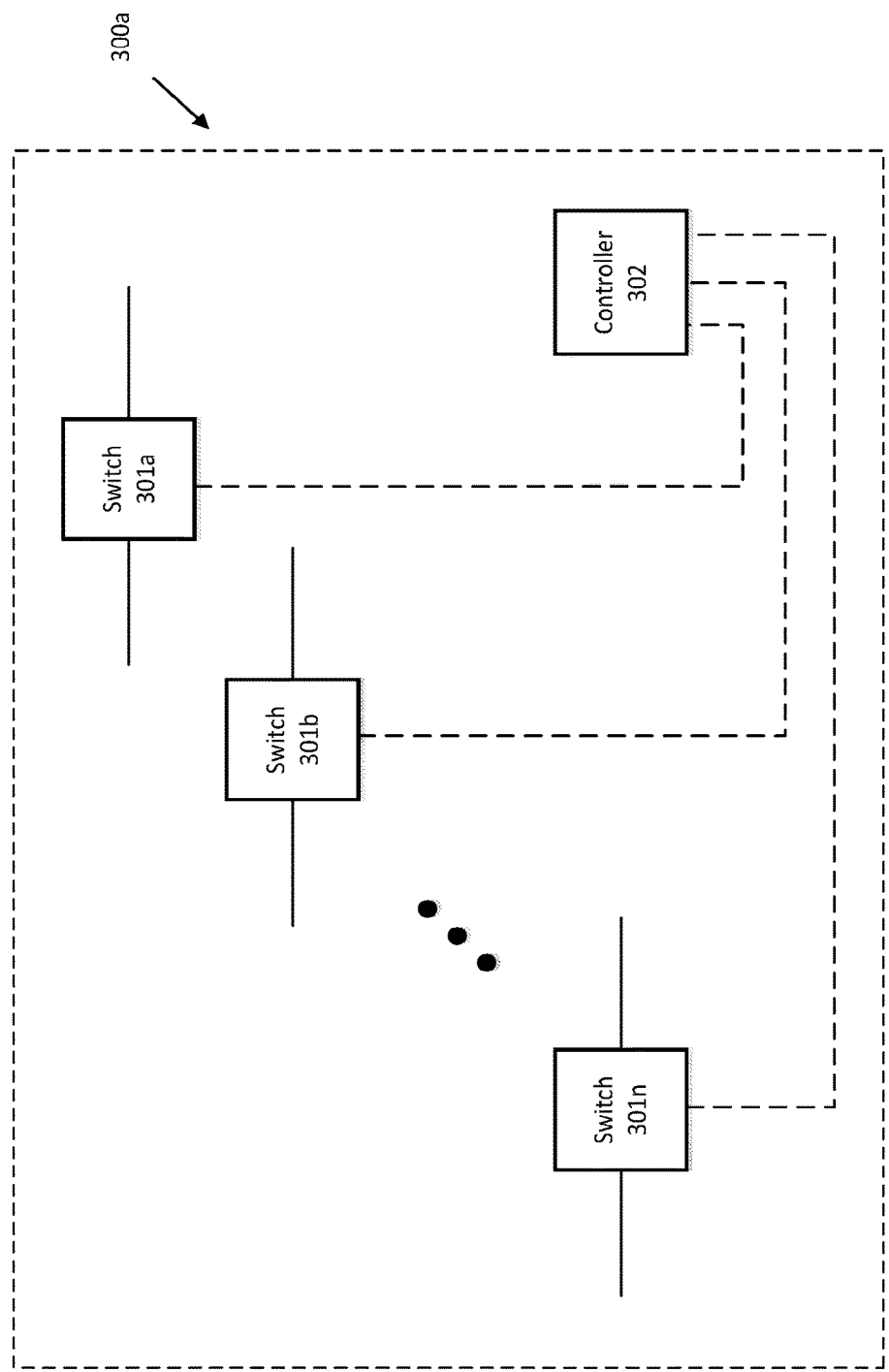
FIG. 3a illustrates a centralized control method according to illustrative features.
Figure 3B:
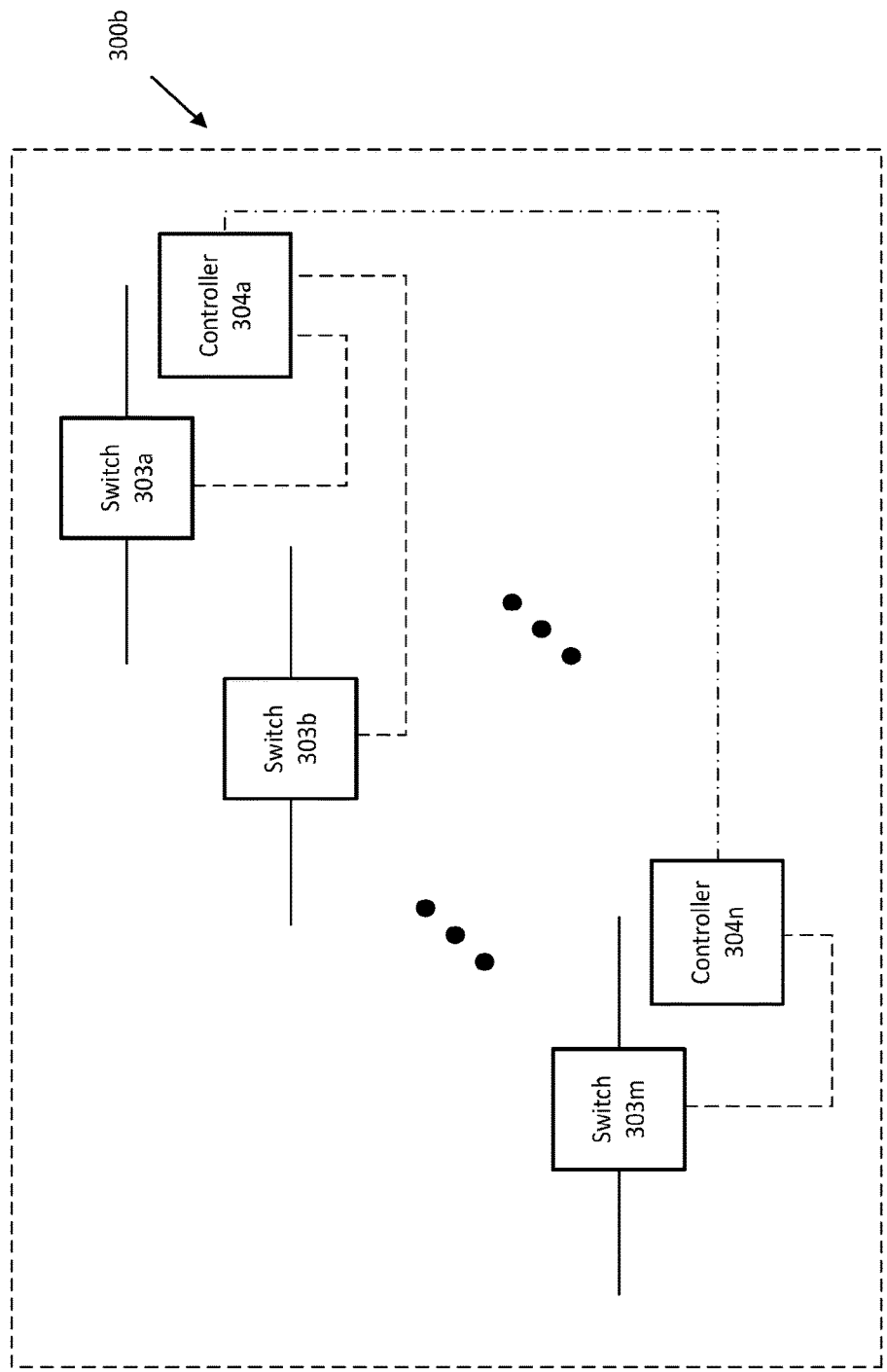
FIG. 3b illustrates a decentralized control method according to illustrative features.

The systems for switching the switches by one or more controllers may be done utilizing a variety of configurations. FIG. 3a illustrates a system 300a using a centralized control method, wherein a single controller 302 switches the switches 301a . . . 301n. That is, controller 302 may be used to switch each of switches 301a . . . 301n to an "on" position or to an "off" position. FIG. 3b illustrates a system 300b that may use a decentralized control method, or a distributed method. Each group of switches (303a . . . 303m) has a corresponding controller 304a . . . 304n. Controllers 304a-304n may communicate in order to share information such as power measurements and priority labels. In one example, multiple switches may be combined into a single group, and one controller may control each of the switches in the single group.

Figure 4:
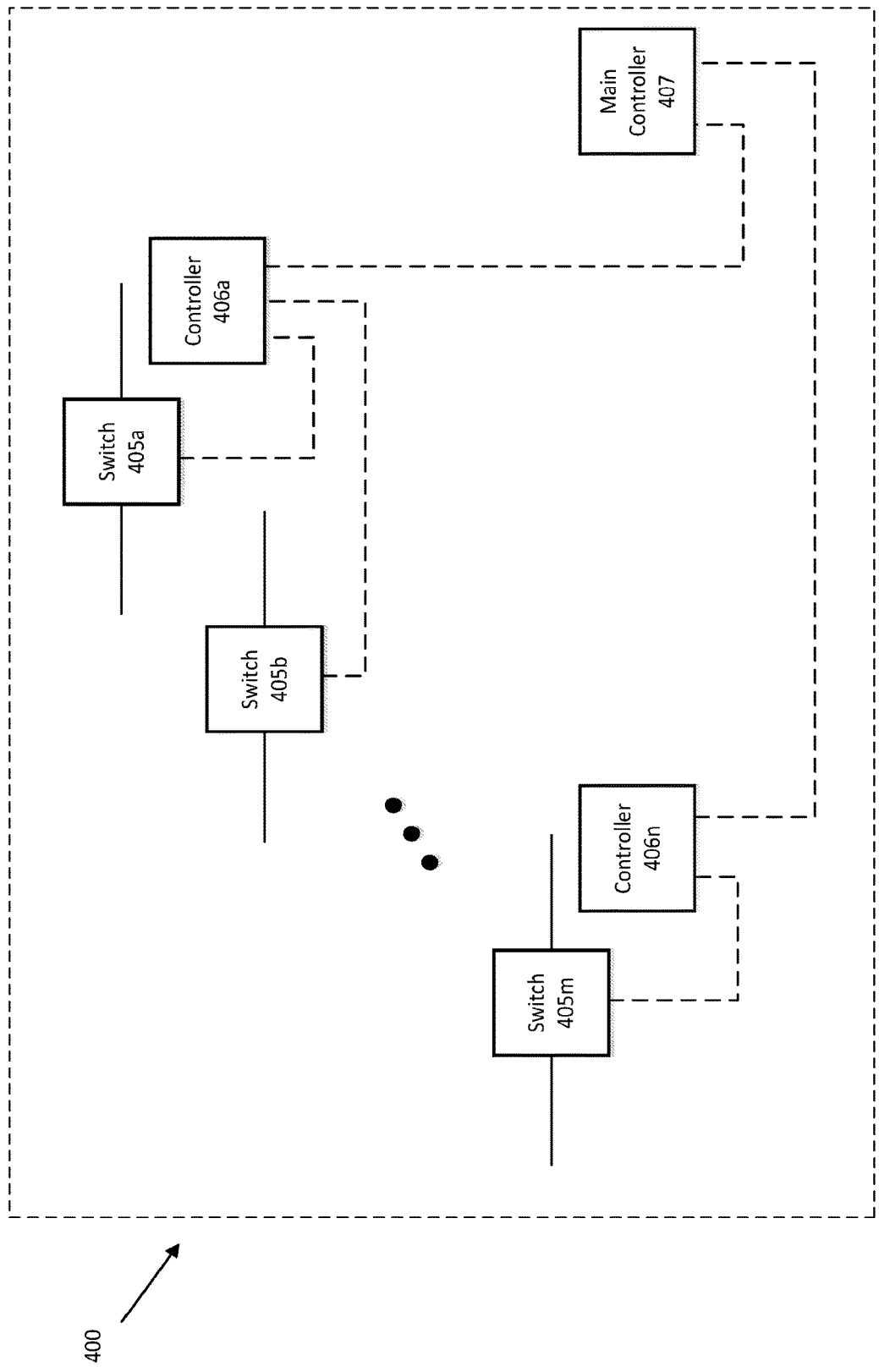
FIG. 4 illustrates a combination of a centralized control method and a decentralized control method according to illustrative features.

FIG. 4 illustrates a system 400 using a hybrid control method comprising switches 405a-405m collectively referred to as switches 405, controllers 406a-406n collectively referred to as controllers 406, and main controller 407. Each controller of controllers 406 controls a group of one or more switches of switches 405. Main controller 407 may communicate with and control controllers 406 via a centralized control system. According to features of the disclosure herein, controllers 406 may communicate with each other and bypass main controller 407.

Controllers (e.g. controllers 304a-304n, controllers 406a-406n and/or main controller 407) may communicate with each other using various methodologies and technologies. According to features of the disclosure herein, communication between a main controller (e.g. main controller 407) and other controllers (e.g. controllers 406a-406n) may be simplex communication. In simplex communication, information may be transmitted only in one direction. For example, the main controller 407 may only send information to the other controllers 406 but might not receive information from controllers 406, or vice versa. According to features of the disclosure herein, half-duplex or full-duplex communication may be used, wherein the controllers may bi-directionally transmit and receive data to each other.

The communication between the controllers (e.g. controllers 406a-406n and/or main controller 407) may be over various mediums such as wireless, power lines, telephone or internet lines and dedicated lines, and also in a variety of communication protocols such as ZigBee™, ZigBee home automation, Wi-Fi, Bluetooth™, x10, Ethernet, various cellular protocols, PLC, or any other communication protocol that may be found suitable. For example, if the main controller 407 already has built-in Wi-Fi, it may be advantageous to integrate Wi-Fi chips in the smart outlets. In areas where connectivity may be unacceptable (e.g. the main controller 407 may be a part of a roof-mounted power converter, and some smart outlets may be buried in the basement), or to increase reliable communication in some scenarios, PLC may be preferable.

According to features of the disclosure herein, a controller such as main controller 407 of FIG. 4 or controller 604 of FIG. 6 may communicate with other controllers such as controller 406a of FIG. 4 or smart outlets such as smart outlet 602a of FIG. 6 (discussed below) by modulating a high frequency signal (e.g. at a frequency of 1 kHz, 10 kHz, 100 kHz, 1 MHz or even higher) over the power lines. Power lines communication (PLC) uses the existing wires for power as network cables for communication. For example the controller may use a frequency modulation scheme such as frequency-shift keying (FSK) for transmitting information through frequency changes to the AC signal that may be used to transmit power.

According to features of the disclosure herein, a signal may be also an absence of a signal. For example, the communication device may expect to receive a certain signal, and when not detecting such a signal the communication device can interpret this as a change, e.g. a communication device may be configured to receive "ok" signals every 10 seconds, if an "ok" signal is not received, the communication device may react as if a "not ok" signal was received.

According to features of the disclosure herein, a main controller, such as main controller 407 of FIG. 4, may be located at a utility power provider (e.g. a power plant). In this case, the utility power provider may use the main controller to control the power consumption of users by connecting and disconnecting non-critical loads. Users may receive financial incentives in exchange for installing smart outlets that may be disconnected by the utility power provider. For example, when the utility power provider might not keep up with the power demand (e.g., the current load demand or anticipated load demand may be above a threshold, for example, the current or anticipated power production) it may shift the frequency of the AC power produced by the utility power plant. The shift may be by a small amount, for example up to % 1 or up to % 5 of the nominal frequency, in order to minimize disruption to connected loads. The frequency shift may be detected by the smart outlets which may disconnect according to the frequency shift. When there may be excess power produced by the utility power plant, the utility power provider may again shift the frequency of the AC power produced by the utility power plant, and the smart outlets may detection the shift and responsively reconnect.

Alternatively, the main controller may be replaced by a centralized (e.g., "in the cloud") software service. The measurements and the control signal may be transmitted over the internet from and to the controllers. This feature may be robust during a power outage because telephone lines usually do not depend on the main grid.

Figure 5:
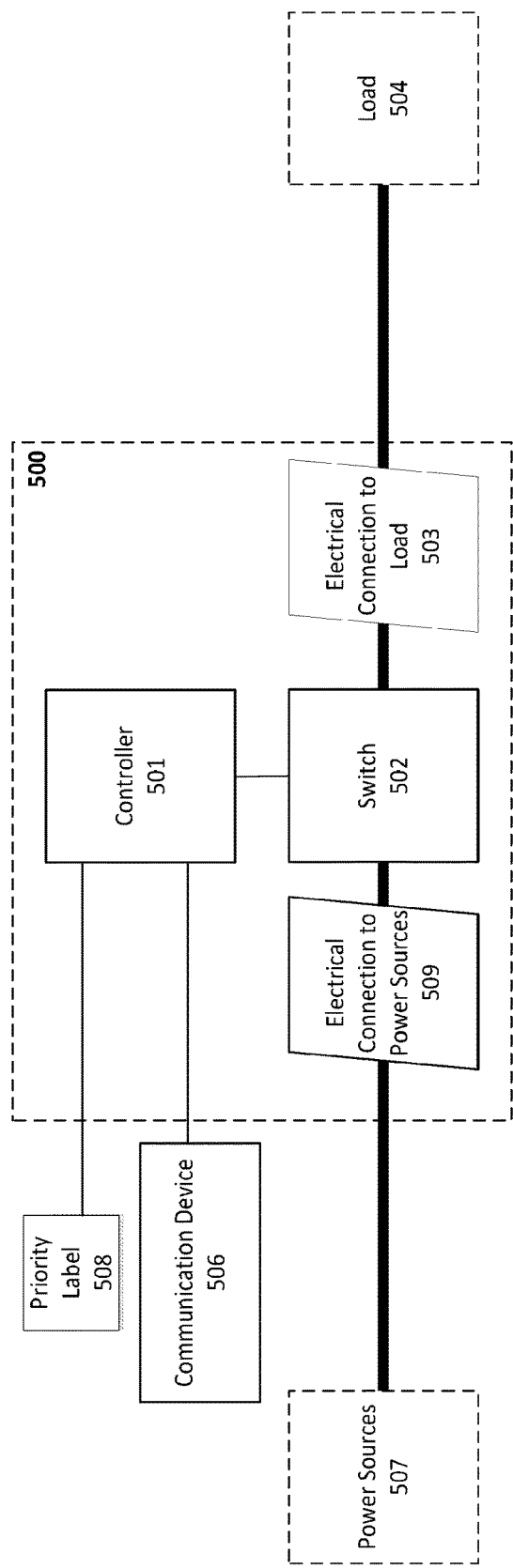
FIG. 5 illustrates a Smart Outlet according to illustrative features.

Reference is now made to FIG. 5, which portrays a smart outlet according to illustrative features. Smart outlet 500 may be enclosed in a casing designed to be placed on any interior or exterior surface in a premises (e.g. a wall, ceiling, floor, table, countertop, etc.). Electrical connection 509 of smart outlet 500 may connect to power sources 507 via power lines that may be on or in the surface that smart outlet 500 is be placed on. Smart outlet 500 may also be designed to connect to existing electrical outlets in a premises by designing electrical connection 509 as a power plug that may be plugged to the existing electrical outlets. Smart outlet 500 may comprise controller 501, switch 502, electrical connection 509 and electrical connection 503. Controller 501 may be any of the controllers described herein, such as those discussed above in reference to FIGS. 1, 2, 3*a*, 3*b*, 4 etc. Switch 502 may link electrical connection 503 to electrical connection 509. Electrical connection 503 may provide a connection to load(s) 504, and electrical connection 509 may provide a connection to power source(s) 507. Switch 502 may control the power transfer from power source(s) 507 to load(s) 504. According to features of the disclosure herein, communication device 506 may be embedded in smart outlet 500, and according to features of the disclosure herein, communication device 506 may be an external communication device that may be connected to smart outlet 500.

Communication device 506 may be variously implemented. For example, communication device 506 may communicate over power lines, using Power Line Communication (PLC) methods. According to features of the disclosure herein, communication device 506 may comprise wireless transceivers, and may communicate using wireless technologies and protocols, such as ZigBee™, Wi-Fi, Bluetooth™, and/or cellular networks.

Figure 5A:
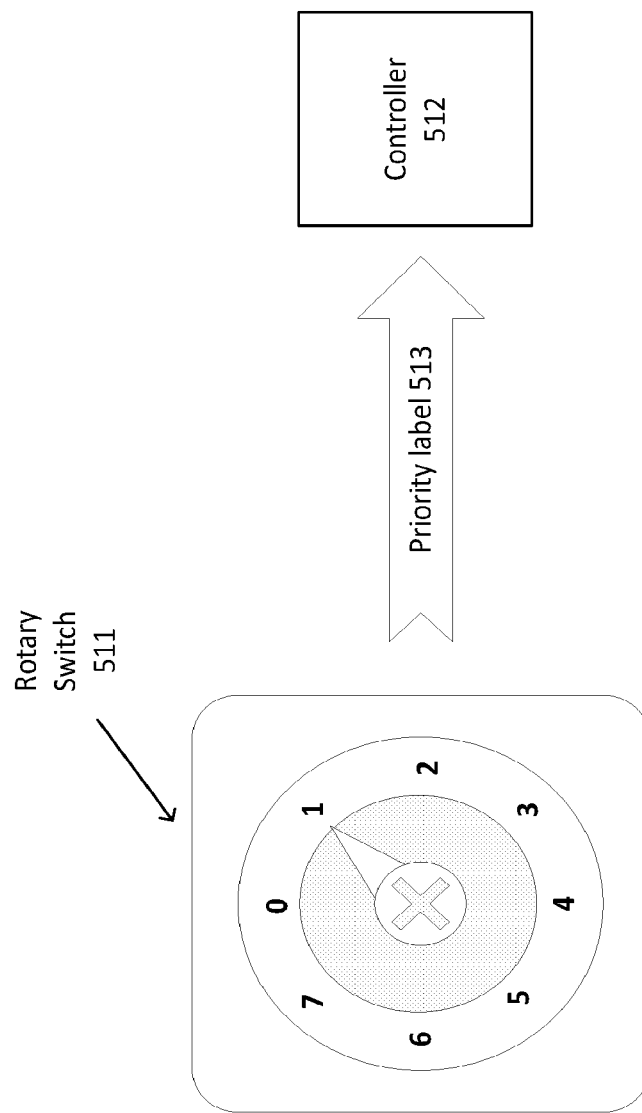
FIG. 5a illustrates a Rotary Switch according to illustrative features.

The value of priority label 508 may be set manually by a user, set automatically by a smart load communicating with smart outlet 500, or set automatically by controller 501. The value assigned to priority label 508 may be set, reset and/or modified according to events in the electrical network. The value of priority label 508 may be stored in memory readable by controller 501 (e.g. in internal controller memory, or in an internal or external memory device coupled the controller), or in a state of a multi-throw switch that may be set by a user. For example, FIG. 5*a* illustrates a rotary switch 511 with eight (8) states. Each state may represent a priority label 513 that may be passed to controller 512. Returning to FIG. 5, communication device 506 may receive data indicating the power that may be being supplied by the power source(s), the potential power that may be supplied by the power source(s), the power demand of the smart outlets in a local electric network, a preferred priority label for each load, and other relevant data.

Still referring to FIG. 5, controller 501 may be configured to detect the type of load 504 or the operation being performed by load 504 by analyzing the waveform of the current being drawn by load 504 (e.g. detecting a parameter such as current magnitude, harmonic content, frequency, etc.) or any other available telemetries. Controller 501 may set priority label 508 for load 504 based on this analysis.

According to features of the disclosure herein, smart outlet 500 may include a small energy storage device (e.g. a battery and/or a capacitor). If a load connected to smart outlet 500 has a high peak power demand for short periods of time, this may reshape the power demand curve, and may reduce the peak demand. A storage device may act as a low pass filter, and as a result, signals comprising high frequencies may be filtered by the storage device. If there is too much power produced by the power source, i.e. more than the load requires, it may be stored as energy in the storage device. When the load requires more power than the power source is able to produce, it may get the extra power from the energy stored in the storage device. For example a power source that may produce up to 5 W supplies power for a load that does not require any power in idle mode, and in active mode requires 10 W for 1 second every 1 minute. While the load is in active mode, the storage device may deliver the extra 5 W that the load requires, and while the load is in idle mode, the storage device may "recharge" by storing the excess power produced by the power source.

Figure 6:
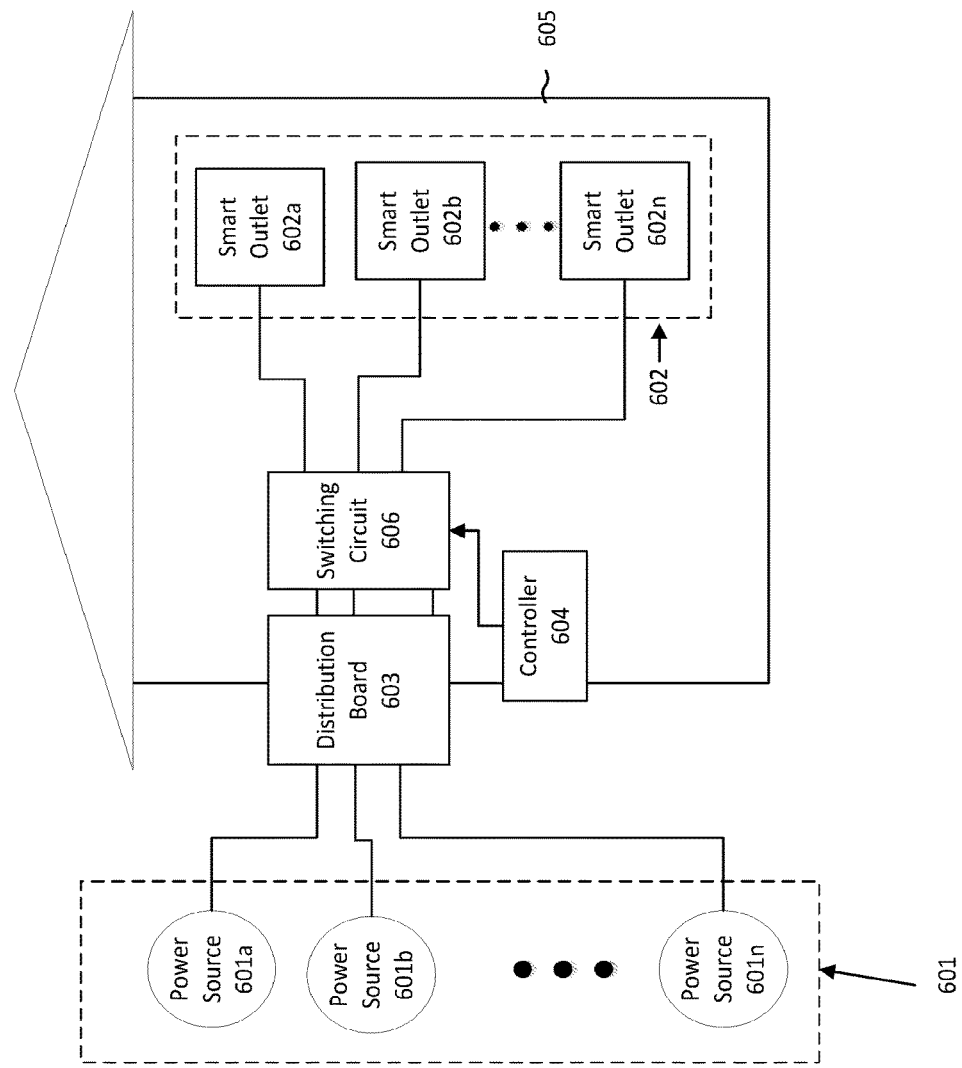
FIG. 6 illustrates a connection of a house to power sources via a distribution board according to illustrative features.

Reference is now made to FIG. 6, which shows premises 605, power sources 601*a*-601*n*, collectively referred to as power sources 601, smart outlets 602*a*-602*n*, collectively referred to as smart outlets 602, distribution board 603, controller 604 and switching circuit 606. Power sources 601 connect via distribution board 603 to premises 605. Smart outlets 602 may be located inside or near premises 605, and may be connected to distribution board 603 via switching circuit 606. Controller 604 may control switching circuit 606. Controller 604 may be any of the controllers described herein, such as those discussed above in reference to FIGS. 1, 2, 3*a*, 3*b*, 3*c*, and/or 5. Controller 604 may disconnect the power from any smart outlet of smart outlets 602 by switching off one or more switches in the switching circuit, thus disconnecting outputs of distribution board 603 from one or more smart outlets 602. Smart outlets 602 may be distributed in different parts of premises 605. Controller 604 may be located near or within distribution board 603. Switching circuit 606 may be a device that links the distribution board 603 to smart outlets 602.

Still referring to FIG. 6, power source 601*a* may be a main power grid, which may be able to provide a high amount of power, and 601*b* may be a power source producing limited power, such as PV sources (e.g. PV cells, PV modules, PV shingles etc.), batteries, wind turbine, flywheels or other alternative power sources. If power source 601*b* is a direct current (DC) power source, power source 601*b* may be connected via a direct current to alternating current (DC-to-AC) converter to the distribution board 603. In case of a power outage or power reduction in the main power grid (power source 601*a*), power source 601*b* may supply enough power to meet the power demand in premises 605. If power source 601*b* does not produce enough power to meet the power demand in premises 605, controller 604 may regulate the power demand by disconnecting one or more smart outlets of smart outlets 602*a*-602*n*, to obtain an operating condition where the power demand is lower than the maximum power that power source 601*b* is able to supply.

Still referring to FIG. 6, communication between various system components may be implemented in various ways. For example, if power source 601*a* is a main grid and the power is transported over an AC current, communication between controller 604 and smart outlets 602*a*-602*n* may be implemented using power line communication (PLC) protocols, or any other change in the power signal provided by power source 601*a* (e.g. changes in the amplitude or frequency) that may be recognized by smart outlets 602*a*-602*n*. For example, a utility grid may provide power to smart outlets 602*a*-602*n* as 50 Hz alternating current with a voltage of 240 Vrms. Smart outlets 602 may be configured to detect a temporary change in the frequency and/or voltage. For example, a smart outlet may be configured to respond (e.g. disconnect or connect a load) to power delivered at a frequency of 51 Hz for about 100 msec, and/or respond to power delivered at an amplitude of 250V for about 100 msec.

Figure 7:
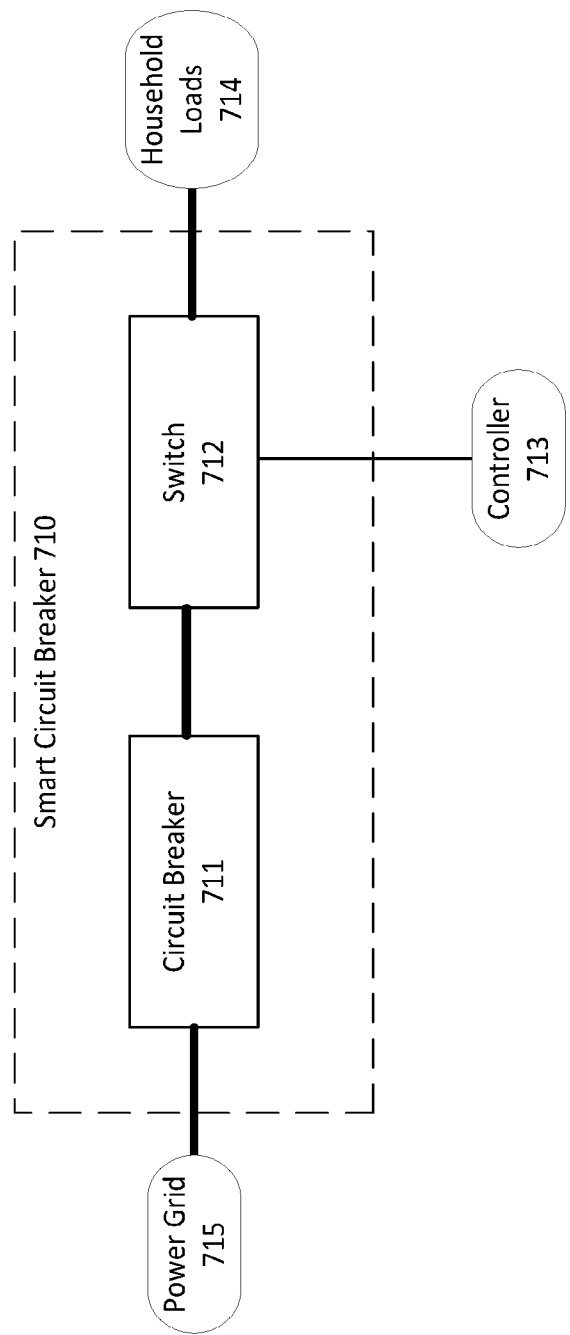
FIG. 7 illustrates a smart circuit breaker according to illustrative features.

Distribution board 603 may comprise one or more circuit breakers that may disconnect the electrical current when the current may be too high. This property of a circuit breaker may be used for safety (e.g. prevent wires from overheating and/or stopping current when there may be a short circuit). According to features of the disclosure herein, switching circuit 606 may be integrated into distribution board 603 by replacing the circuit breakers with smart circuit breakers that may be controlled by controller 604. FIG. 7 illustrates an example for a smart circuit breaker 710 that may comprise circuit breaker 711 and a switch 712. Smart circuit breaker 710 links power grid 715 and household loads 714. Circuit breaker 711 provides the required safety and protection properties, and switch 712 provides the ability to disconnect power grid 715 from loads 714 that may be connected to the smart circuit breaker 710.

Returning to FIG. 6, the communication between various system components may be used to transfer data between the different elements. For example, controller 604 may send commands to connect or disconnect switches from switching circuit 606, send information to smart outlets 602 about available power and/or priority updates. Smart outlets 602 may send measurements to controller 604, share information among each other for different purposes such as sending and receiving power measurements in order to calculate the current available power and consumed power, and/or share information regarding connected loads in order to dynamically change the priority labels.

Figure 8:
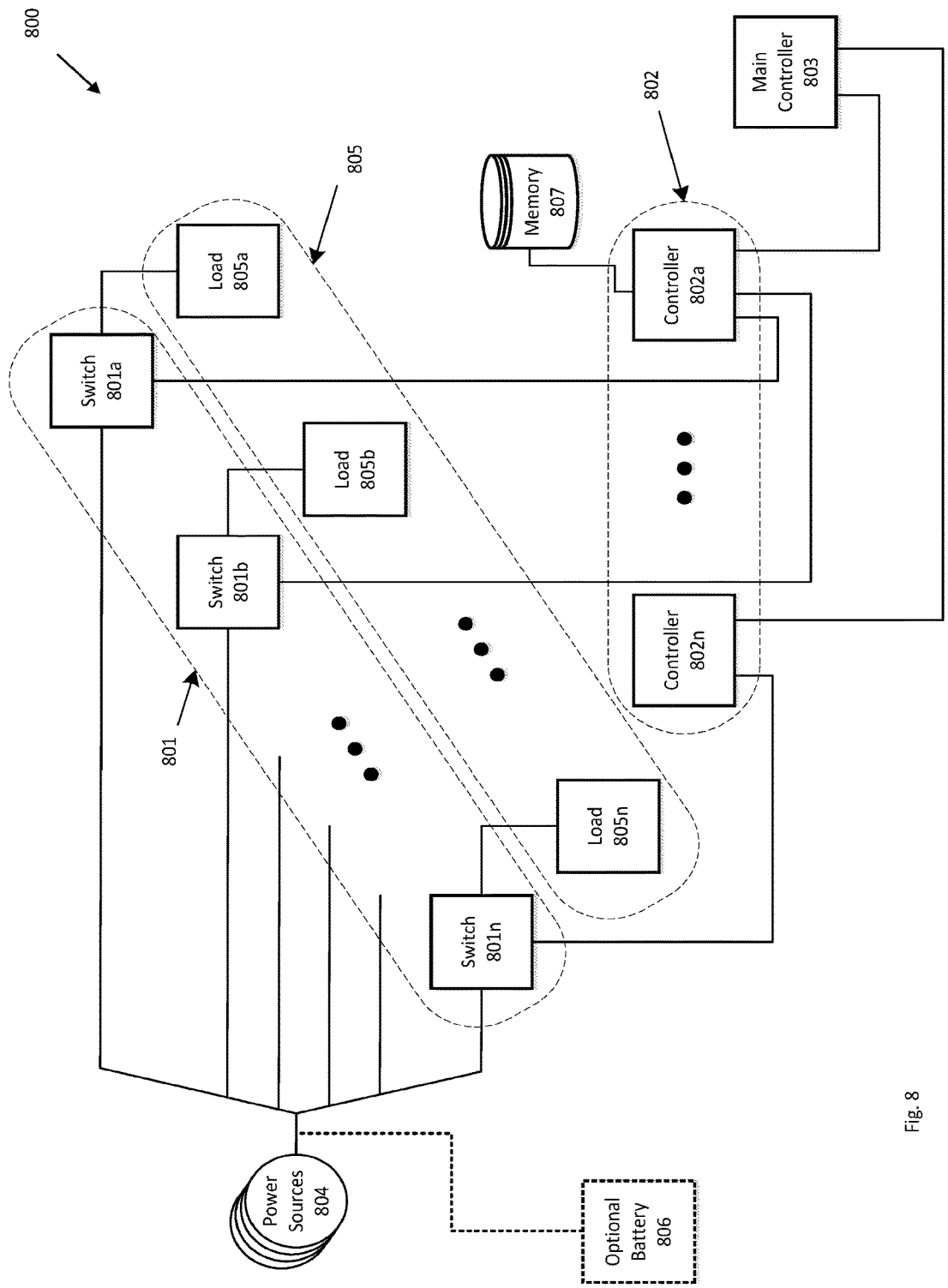
FIG. 8 illustrates an electrical network according to illustrative features.

Reference is now made to FIG. 8, which illustrates a system using a two-priority control methodology according to illustrative features. System 800 comprises power sources 804, loads 805a-805n collectively referred to as "loads 805," switches 801a-801n, collectively referred to as "switches 801," controllers 802a-802n, collectively referred to as "controllers 802," main controller 803, an optional storage device 806, and memory 807. Each switch or a group of switches of switches 801 may be controlled via a corresponding controller of controllers 802. Each switch or a group of switches of switches 801 may have a first priority label or a second priority label. The value of the first priority label may indicate a higher priority than the value of the second priority label. The value of the priority labels may be stored in a memory such as memory 807. Each controller of controllers 802 and main controller 803 may have a memory of its own, or each controller may share one or more memories with one or more controllers. The power supply to power demand ratio of the system 800 may be in one of two modes. In a first mode, the power demand of loads 805 may be met by the power supplied by power sources 804. In a second mode, the power demand of loads 805 might not be met by the power supplied by power sources 804. When power sources 804 are able to supply enough power to loads 805, switches 801 may be turned "on," regardless of their priority label. When power sources 804 might not supply enough power to loads 805, the group of switches from switches 801 having an associated controller with the second priority label may be disconnected, and the group of switches from switches 801 having associated controllers with the first priority label may remain "on." As a result, the power demand of the connected loads, which are a subset of loads 805, may be less than the total power demand of loads 805. By reducing the power demand of the total connected loads, there may be a greater chance that the power demand may now be met by the power supplied by power sources 804.

In another example, there may be four modes of power supply for a system that includes two power sources. In a first mode, both the first source and the second source may be connected to the system loads. In a second mode, the first power source may be connected to system loads (i.e. it may be able to provide power to system loads) and the second power source may be disconnected from system loads (i.e. it might not be able to provide power to system loads). In a third mode, the first power source may be disconnected from the system loads (i.e. it might not be able to provide power to system loads) and the second power source may be connected to the system loads (i.e. it may be able to provide power to system loads). In a fourth mode, both the first and second power sources may be disconnected from the system loads.

The first source may support nearly any power demand, and the second power source may provide limited output power. When both the first and second power sources are connected to the system loads, sufficient power may be provided by these sources to the system. When the first power source is connected and the second power source is disconnected, sufficient power may also be provided by these sources to the system. When both sources are disconnected the power demand might not be met, as sufficient power might not be provided to the system. When the first source is disconnected and second source is connected, there may be two possible scenarios related to the power provided by the second power source. In one scenario, the power provided by the second power source may be higher than the power demand, and in a second scenario the power provided by the second power source may be not higher than the power demand. If the power provided by the second power source is higher than the power demand, then sufficient power may be supplied by the second power source to the system. If the power provided by the second power source is lower than the power demand of the connected loads, then sufficient power might not be supplied by the second power source to the system 800.

Additionally, when the first source is disconnected and second source is connected, there may be two possible scenarios related to the energy provided by the second power source. In one scenario, the energy provided by the second power source may be higher than the energy demand of the system over a certain time interval. In a second scenario, the energy provided by the second power source may be not higher than the energy demand over a certain time interval (e.g. a source that involves a power storage device). In the second scenario, there may be a desire to draw less power from the source until the first power source is connected to the system.

In both of these instances (i.e. when the first source is disconnected and second source is connected and where the power or the energy provided by the second power source is not higher than the demand), there may be a need or desire to reduce the power demand by disconnecting loads. This may be achieved by disconnecting one or more loads. For example, as indicated in FIG. 8, main controller 803 may send a signal to controllers 802. The signal may indicate a change in the mode of the system. In response to receiving the signal, each controller of controllers 802 may disconnect one or more loads of loads 805 from the system. In one example, each controller or switch may execute method 1050 of FIG. 10 (discussed below).

In some of the features, it may be desirable to measure the power demand and the power supplied within system 800. For example, smart outlets that may include a measuring device for measuring voltage, current and/or power (e.g. wattmeter, voltmeter, and ammeter) and providing the measurements to an associated control device. According to features of the disclosure herein, (e.g. in systems having two power sources, where one of the power sources may be the main power grid and the second power source may be a limited power source), it might not be necessary to measure power supplied to the system. If the amount of power that may be provided by the second power source may be known in advance, and the amount of power that may be provided by the second power source may be enough to support a subset of loads in the electrical network, it may be sufficient to determine whether or not the main power grid is connected to the system. This may be executed by detecting islanding. As noted above, in one example, a system may have two power sources, where one of the power sources may be the main power grid and the second power source may be a limited power source. When only the limited source is connected it may be assumed that there may be a need to reduce power consumption automatically. If the main power grid is connected, the switches may be "on." When the main power grid is disconnected (e.g., due to islanding), switches that have the second priority label may be disconnected. This ability may be achieved by different ways in different systems, depending on the components that comprise the system. For example in a PV system, there may be a converter (e.g., a DC/AC inverter) connected between the second power source (e.g. PV generators) and the first power source (e.g. the grid). The converter may have the ability to detect the disconnection of the main grid (e.g., the ability to detect islanding). Island detection may be performed using various methods, including:

Passive methods e.g. under/over voltage/frequency, rate of change of frequency, Harmonics detection etc.
Active methods e.g. negative-sequence current injection, Impedance measurement, slip mode frequency shift etc.
Utility-based methods (e.g. the use of signals sent through the grid, transfer-trip method etc.).

In some scenarios, local utilities may require islanding detection as a prerequisite for connecting an alternative power source to the main grid, also referred to as anti-islanding protection. This may involve the inclusion of elements that have the ability to stop delivering power to the main power grid, while maintaining the power supply to the local network. This may be accomplished by adding a switch that disconnects the main power grid when there may be a power outage, and reconnects it when the power restores. It may be possible to take advantage of this property of islanding detection that may be already implemented in the system for the feature illustrated in FIG. 6.

Figure 9A:
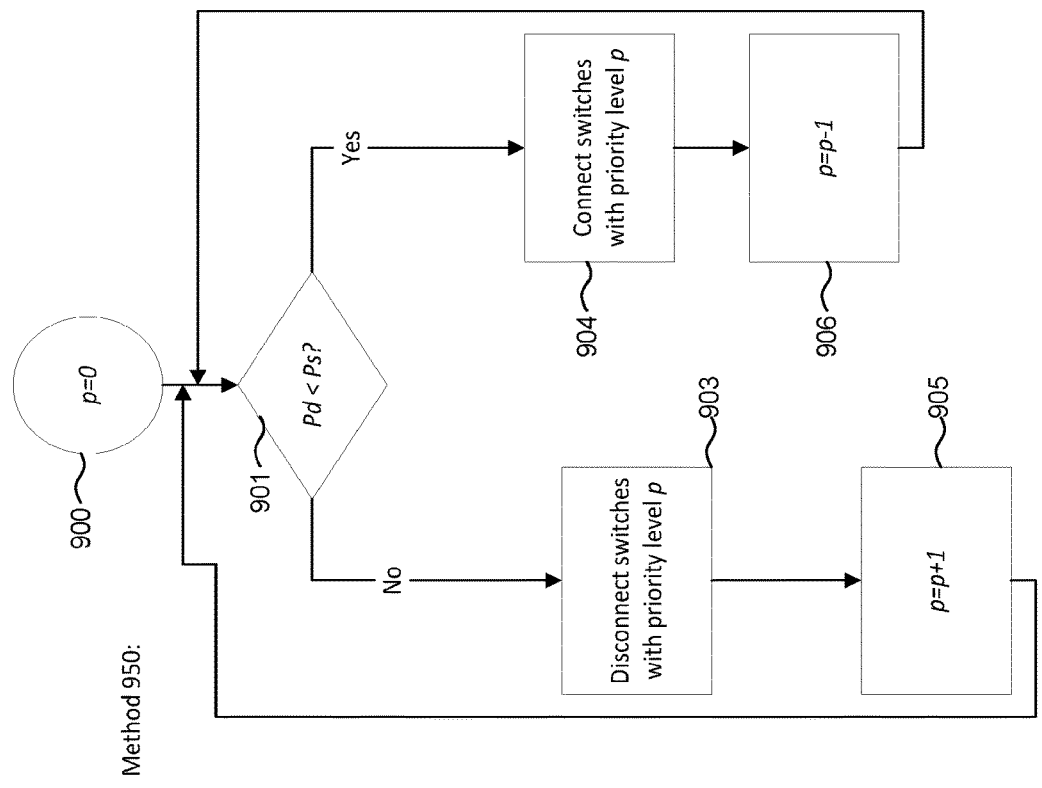
FIG. 9a illustrates a method for switching according to illustrative features.

Reference is now made to FIG. 9a which shows a flow diagram of method 950 for priority switching in an electrical network according to illustrative features. Method 950 may be carried out by any of the one or more controllers referred to herein, such as controller(s) 205 or controller 302, and may be applied to any of the electrical system referred to herein, such as system 100, system 200, system 300a, system 300b, etc. To simplify description of method 950, an assumption may be made that initially (i.e. at step 900) the switches are turned "on." One skilled in the art would be able to apply the method to an electrical system under different initial conditions. The variable p holds the value of the lowest priority label currently assigned to any of the load(s) connected to the power source. At step 900 the variable p is set to "0", which may be assumed to be the lowest priority label currently assigned to load(s) connected to the power source in this illustrative feature of method 950.

At step 901 the controller carrying out method 950 compares the available power from the power sources (shown as $P_s$) and the power demand of the loads (shown as $P_d$) of the electrical system. The controller may receive one or more measurements of available power (e.g. power produced by a power source such as power source 201 of FIG. 2) and current power demand of the loads (i.e. the amount of power required by a group of loads such as loads 204a-204n of FIG. 2) of the electrical system. The measurements may be directly measured by sensors/sensor interfaces or devices included in the controller(s) (e.g. controller(s) 205 of FIG. 2), or may be provided to the controller(s) via one or more communication devices (e.g. communication device 506 of FIG. 5, discussed above). If it is determined, at step 901, that the available power might not meet the power demand (i.e. $P_d > P_s$), the controller carrying out method 950 advances to step 903. At step 903, the controller turns the switches that have a p priority label to "off." At step 905, the value of p may be increased by 1, and then the method returns to step 901 to check if the power demand is less than the available power. If this is not sufficient (i.e. it may be determined again at step 901 in the next iteration that $P_d > P_s$), then the method again may advance to step 903, wherein the switches with the priority label that is equal to the new value of p (here, "1") may be turned off. Method 950 may repeat this process until the power demand is low enough (i.e. less than the available power).

If, at step 901, it is determined that the power demand is less than the available power from the powers sources (i.e. $P_d < P_s$), the method may advance from step 901 to step 904. At step 904, the controller may connect switches with priority level p (here, "0"), to the power sources. The method may then proceed to step 905, where the controller may reduce p by 1 at step 906, but not less than the minimum priority label in the system. If the value of p is already the value of the lowest priority label in the system then p may stay the same.

Figure 9B:
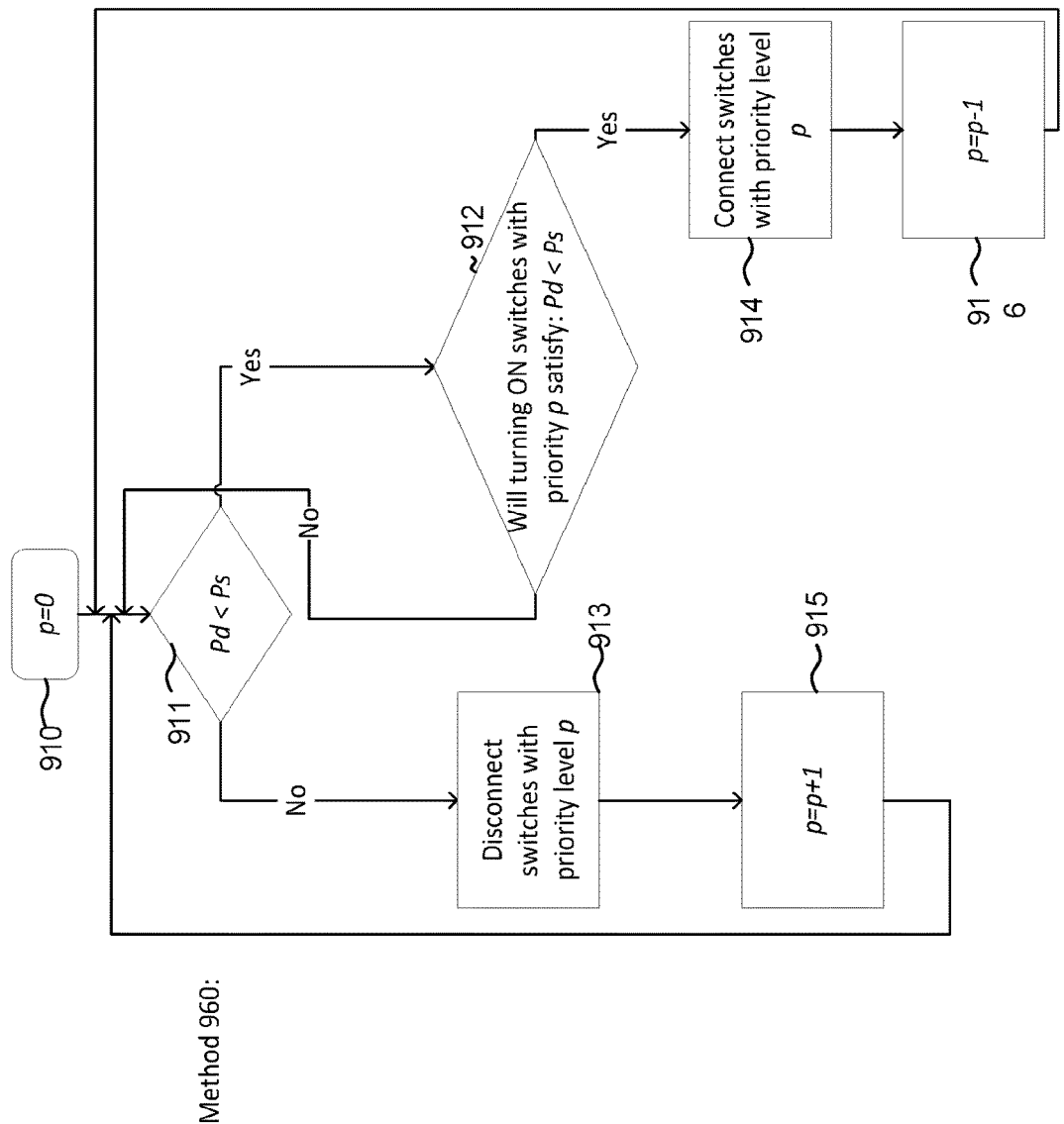
FIG. 9b illustrates a method for switching according to according to illustrative features.

Reference is now made to FIG. 9b which shows a flow diagram of method 960 for priority switching in an electrical network according to illustrative features. Method 960 may be carried out by any of the one or more controllers referred to herein, such as controller(s) 205 and/or controller 302, and may be applied to any of the electrical system referred to herein, such as system 100, system 200, system 300a, system 300b, etc. To simplify description of method 960, an assumption is made that initially (i.e. at step 900) the switches are turned "on." One skilled in the art would be able to apply the method to an electrical system under different initial conditions. The variable p holds the value of the lowest priority label currently assigned to any of the load(s) connected to the power source. At step 910 the variable p may be set to "0", which is assumed to be the lowest priority label currently assigned to load(s) connected to the power source in this illustrative feature of method 960.

At step 911, the controller carrying out method 960 may compare the available power from the power sources (shown as $P_s$) and the power demand of the loads (shown as $P_d$). The controller may receive one or more measurements of available power (e.g. power produced by a power source such as power source 201 of FIG. 2) and current power demand of the loads (i.e. the amount of power required by a group of loads such as loads 204a-204n of FIG. 2). The measurements may be directly measured by sensors/sensor interfaces or by devices included in the controller(s) (e.g. controller(s) 205 of FIG. 2), or may be provided to the controller(s) via one or more communication devices (e.g. communication device 506 of FIG. 5, discussed below). If it is determined, at step 911, that the available power might not meet the power demand (i.e. $P_d > P_s$), the controller carrying out method 960 advances to step 913. At step 913, the controller turns the switches that have a p priority label to "off." At step 915, the value of p may be increased by 1, and then the method may return to step 911 to check if the power demand is less than the available power. If this is not sufficient (e.g., it may be determined again at step 911 in the next iteration that $P_d>P_s$), then the method again may advance to step 913, wherein the switches with the priority label that is equal to the new value of p (here, "1") may be turned off. Method 960 may repeat this process until the power demand is low enough (i.e. less than the available power).

If, at step 911, it is determined that the power demand is less than the available power from the powers sources (i.e. $P_d<P_s$), the method may advance from step 911 to step 912. At step 912, the controller may check if it is possible to connect switches with priority p without violating the inequality $P_d<P_s$ (wherein $P_d$ represents the power demand of the loads and $P_s$ represents the available power of the power source). Stated differently, the controller may determine whether connecting the loads with priority p to the power source may result in the amount of available power exceeding the power demand from the loads. If it is determined at step 912 that connecting the loads with priority p to the power source may result in the amount of available power exceeding the power demand from the loads, the controller implementing method 960 may return to step 911 to check if Pd<Ps again. If the result of this comparison has changed from a previous iteration of the method, the change may indicate that there was a change in the power demand or the power available, or both. If it is determined at step 912 that connecting the loads with priority p to the power source might not result in the amount of available power exceeding the power demand from the loads, method 960 may proceed to step 914. At step 914, the controller may connect switches with priority level p (here, "0"), to the power sources. The method may then proceed to step 916, where the controller may reduce p by 1, but not less than the minimum priority label. If the value of p is already the value of the lowest priority label then p may stay the same. Method 960 may then return to step 911, where the method 960 may be repeated for the next group of switches of (i.e. switches that have a priority of p−1).

Methods 950 and 960 (as described in FIG. 9a and FIG. 9b) may each be useful in the event where one or more power sources within a system may produce sufficient power, but the energy stored by the power source (i.e., the ability of the power source to provide power over time) might not be enough to support the production of sufficient power for a long period of time. In this case, there may be a need to reduce the energy demand, which may be done by reducing the power demand (i.e. by disconnecting loads from the power source). For example, a power storage device such as a battery may be charged with 10 kWh and may serve as a power source for a load. If the power demand of the load connected to the battery is 2 kW, the battery charge may last for 5 hours, but if the power demand of the load is reduced to 1 kW, then the battery charge may last for 10 hours.

Figure 10:
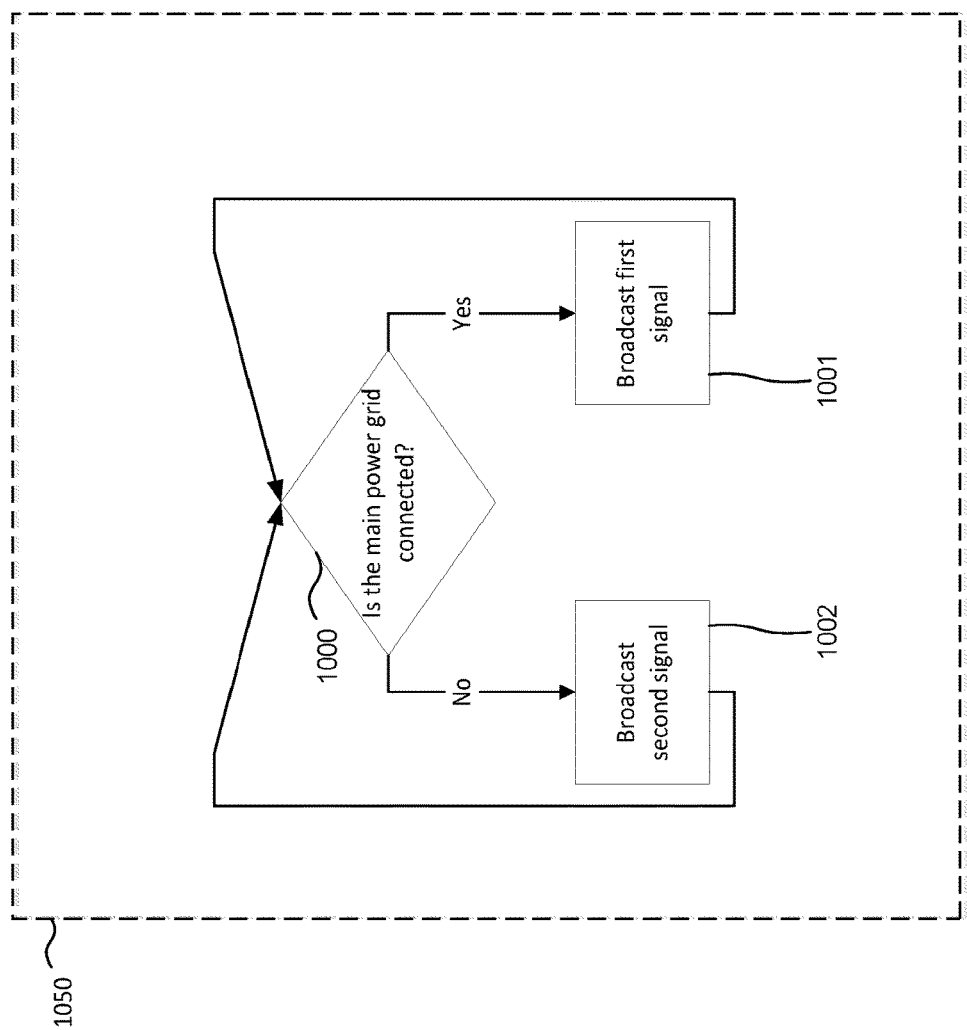
FIG. 10 illustrates a method for operating a broadcast signal according to illustrative features.

Reference is now made to FIG. 10, which presents an example method 1050 for managing a power system having two power sources. One power source of these two power sources may be an alternative power source (e.g. a PV source, storage device, windmill or other alternative power sources). The system may further comprise a plurality of smart outlets, such as the smart outlet shown in FIG. 5. A priority label set associated with the plurality of smart outlets may have two elements, a first priority label and a second priority label. The value of the first priority label may indicate a higher level of priority than the value of the second priority label. Method 1050 may be carried out by a system-control device, such as controller 302 of FIG. 3a or main controller 803 of FIG. 8. In a system with a PV source, a converter within the system may include the system-control device.

The system-control device may start method 1050 at step 1000, where the system-control device may determine if a main power grid is connected to the smart outlets. In one example, the system-control device may make use of islanding-detection methods to determine if the main power grid is connected. If the controller determines at step 1000 that the main power grid is connected to the smart outlets, then the system-control device may advance to step 1001. At step 1001, the system-control device may broadcast a first signal. The first signal may broadcast a value corresponding to the value of the first priority label. This signal may be received by smart outlets and may indicate to the smart outlets that the power sources may provide enough power to support the loads in the system. In response, smart outlets may carry out step 1115 of method 1160 (described below) according to the received first signal. If it is determined at step 1000 that the main power grid is not connected, then the system-control device may proceed to step 1002, in which the system-control device may broadcast a second signal. The second signal may broadcast a value corresponding to the value of the second priority label. The second signal may be received by smart outlets and may indicate to them that the power sources may support a subset of the loads in the system. In response, smart outlets may carry out step 1113 of method 1160 (described below) according to the received second signal.

Figure 11:
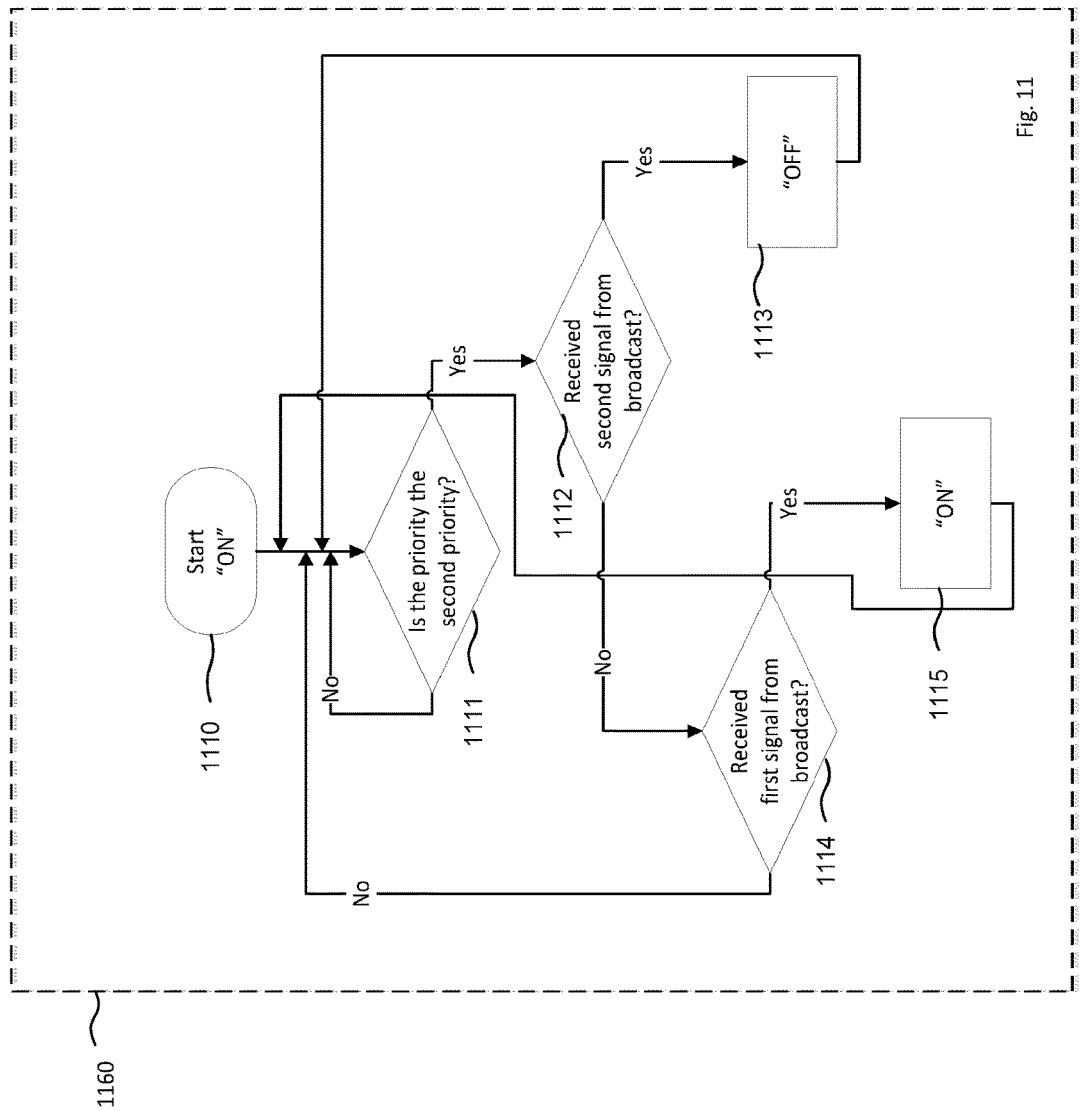
FIG. 11 illustrates a method for operating a broadcast signal according to illustrative features.

Reference is now made to FIG. 11, which presents an example method 1160 that may be executed by smart outlets within the system discussed above in reference to FIG. 10. Method 1050 and 1160 may be executed simultaneously or near-simultaneously by the system-control device and the Smart Outlets, respectively. Each smart outlet may be executing method 1160 independently, or there may be a main controller executing method 1160 for each smart outlet and passing the resultant commands to the smart outlets. At step 1110, the Smart Outlets may be initialized to "ON." At step 1111, each Smart Outlet may determine whether its priority is set to the second priority label. If the Smart Outlet determines, at step 1111, that its priority is not the value of the second priority label, then no action may be taken and the method may loop back to step 1111. The priority of the Smart Outlet is set to the value of the first priority label which indicates that the Smart Outlet may be "ON" in any scenario, until the priority of the Smart Outlet is changed to the value of the second priority label.

If the Smart Outlet determines, at step 1111, that its priority is the value of the second priority label, then the Smart Outlet proceeds to step 1112. At step 1112, the Smart Outlet checks (e.g., by monitoring a communication channel) whether a second signal is being broadcasted from the system-control device (at steps 1002 and 1001, discussed above in reference to FIG. 10). If a second signal is not being broadcasted, then the Smart Outlet proceeds to step 1114, where it determines if a first signal is being broadcasted from the system-control device. If a first signal is not detected at step 1114, then the Smart Outlet returns to step 1111. If the Smart Outlet determines at step 1114 that the signal coming from the system-control device is the first signal then the Smart Outlet may proceed to step 1115, where it may turn "ON." The Smart Outlet may then return to step 1111. If the Smart Outlet detects the second signal at step 1112, the Smart Outlet may proceed to step 1113. At step 1113, a smart outlet that has the second priority label may be turned "OFF." The Smart Outlet may then return to step 1111.

According to features of the disclosure herein, it may be desired to detect if a load is connected to an electrical connection. If the load is not connected to an electrical connection, the electrical connection may be disregarded by an associated method such as method 1160 of FIG. 11 or method 950 of FIG. 9*a* to save computational time and memory resources. Detecting if a load is connected may be done by measuring the impedance at the output of the electrical connection, or by measuring the power transferred from the electrical connection, or by measuring the current through the electrical connection, or by a sensor that may mechanically detect that there is a plug in the socket (e.g. a spring that closes an electrical circuit, a proximity sensor etc.).

Figure 12:
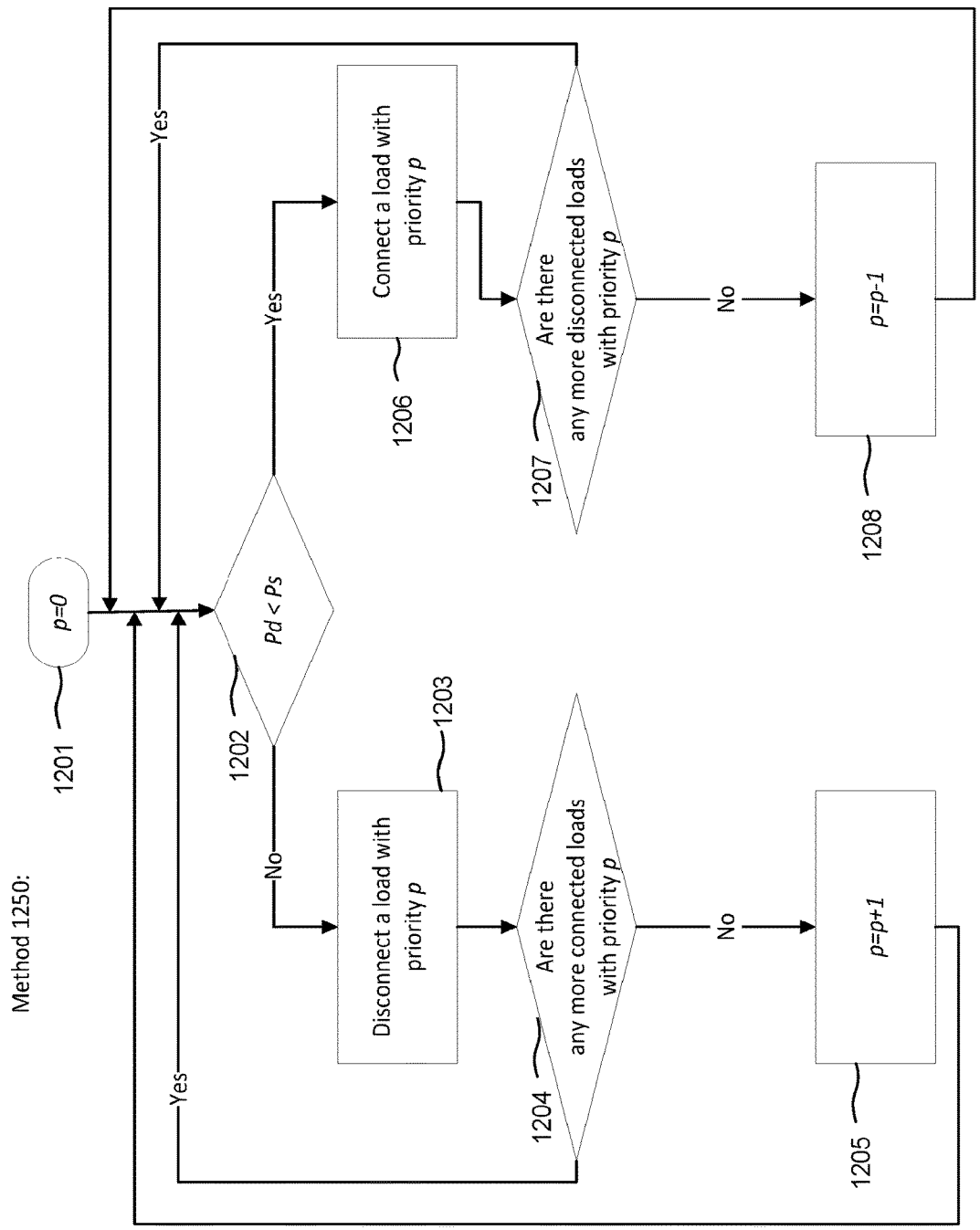
FIG. 12 illustrates a method for switching according to illustrative features.

Reference is now made to FIG. 12, which illustrates a method 1250 for switching loads wherein two or more loads have the same priority label. A system-control device may start at step 1201 wherein the value of the variable p may be set to the lowest priority label comprised by connected loads. The system-control device may advance to step 1202 wherein it may determine if the power provided by power sources (e.g. power sources 201 of FIG. 2) may meet the power demand of connected loads (e.g. loads 204), shown as $P_d < P_s$. If the power demand is higher than the power provided (i.e. $P_d > P_s$), the system-control device may proceed to step 1203, wherein a load with priority label p may be disconnected from the power source. The system-control device may then proceed to step 1204, where it may determine if there may be any more connected loads with priority label p. If there are additional connected loads with priority p, the system-control device may return to step 1202. If there are no more loads with priority label p, then the system-control device may increase the value of p to the next higher value at step 1205, and may return to step 1202.

If at step 1202 the power demand is lower than the power provided (i.e. $P_d < P_s$), the system-control device may proceed to step 1206, wherein it may connect a load with priority label p, and may advance to step 1207. At step 1207, the system-control device may determine if there are any more disconnected loads with priority label p. If there are additional disconnected loads with priority label p, the system-control device may return to step 1202. If there are no more disconnected loads with priority label p, then the value of p may be reduced to the next lower value at step 1208, and the system-control device may return to step 1202.

Figure 13:
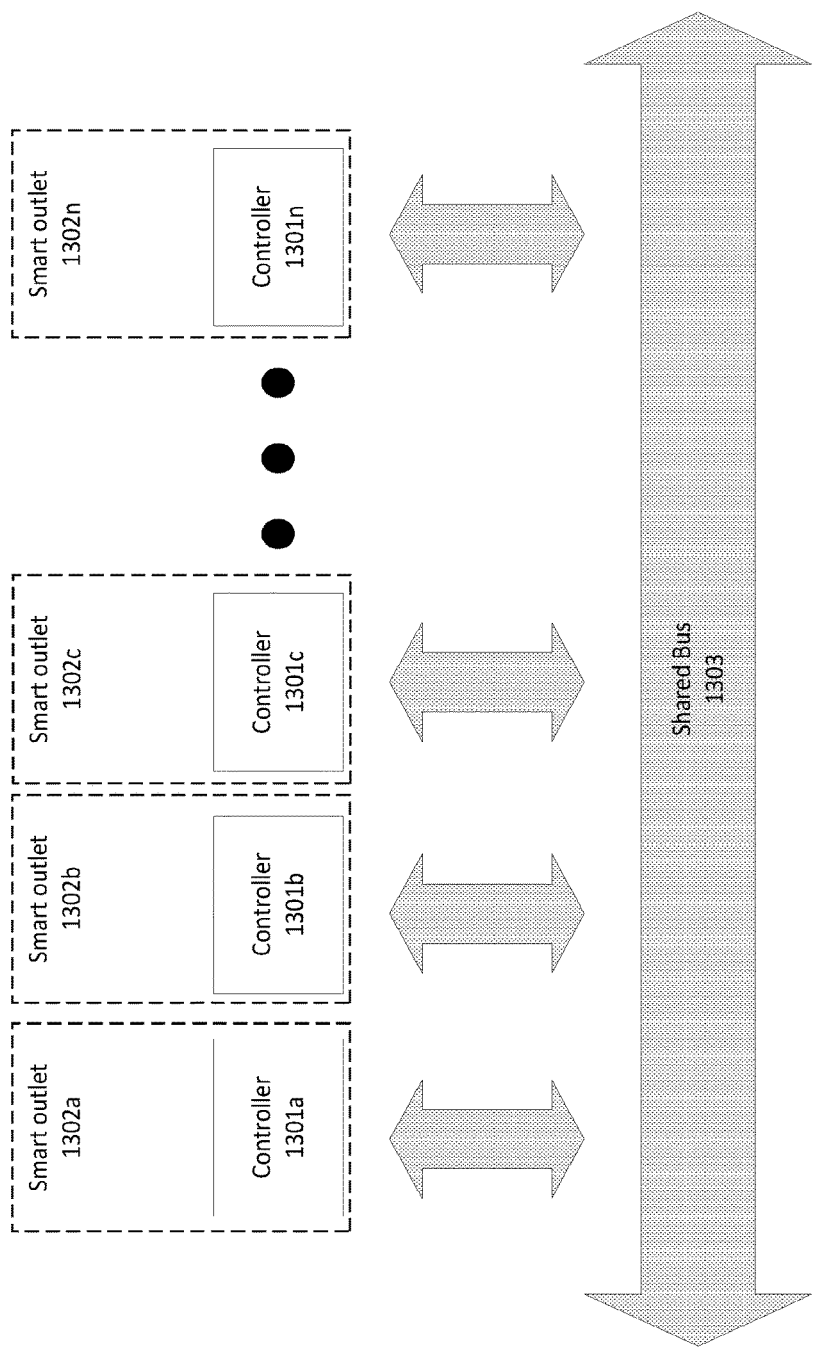
FIG. 13 illustrates communication between controllers according to illustrative features.

Reference is now made to FIG. 13, which illustrates a system for inter-controller communication according to illustrative features. FIG. 13 comprises controllers 1301*a*-1301*n*, smart outlets 1302*a*-1302*n* and shared bus 1303 for communication. Controllers 1301*a*-1301*n* are associated with smart outlets 1302-1302*n* respectively. Shared bus 1303 may be a dedicated wired bus or a shared memory for communication between controllers 1301*a*-1301*n*. Communication between controllers 1301*a*-1301*n* may be used to exchange information such as power measurements and priority labels or messages that may be transferred for when carrying out different methods such as method 950 of FIG. 9*a* or method 1050 of FIG. 10. The shared memory may also be used for saving information regarding the system, such as priority labels, power usage history and more. When shared bus 1303 is a shared memory or a dedicated wire for communication, it may provide advantages when the controllers are located near each other. For example, it may be simple and economically efficient to connect the controllers and/or communication devices to one bus dedicated for communication, or to one shared memory with read and write functions. Another example may be wireless communication, using Wi-Fi, Bluetooth, LTE, or any other wireless protocol that fits the characteristics of the system.

Figure 14:
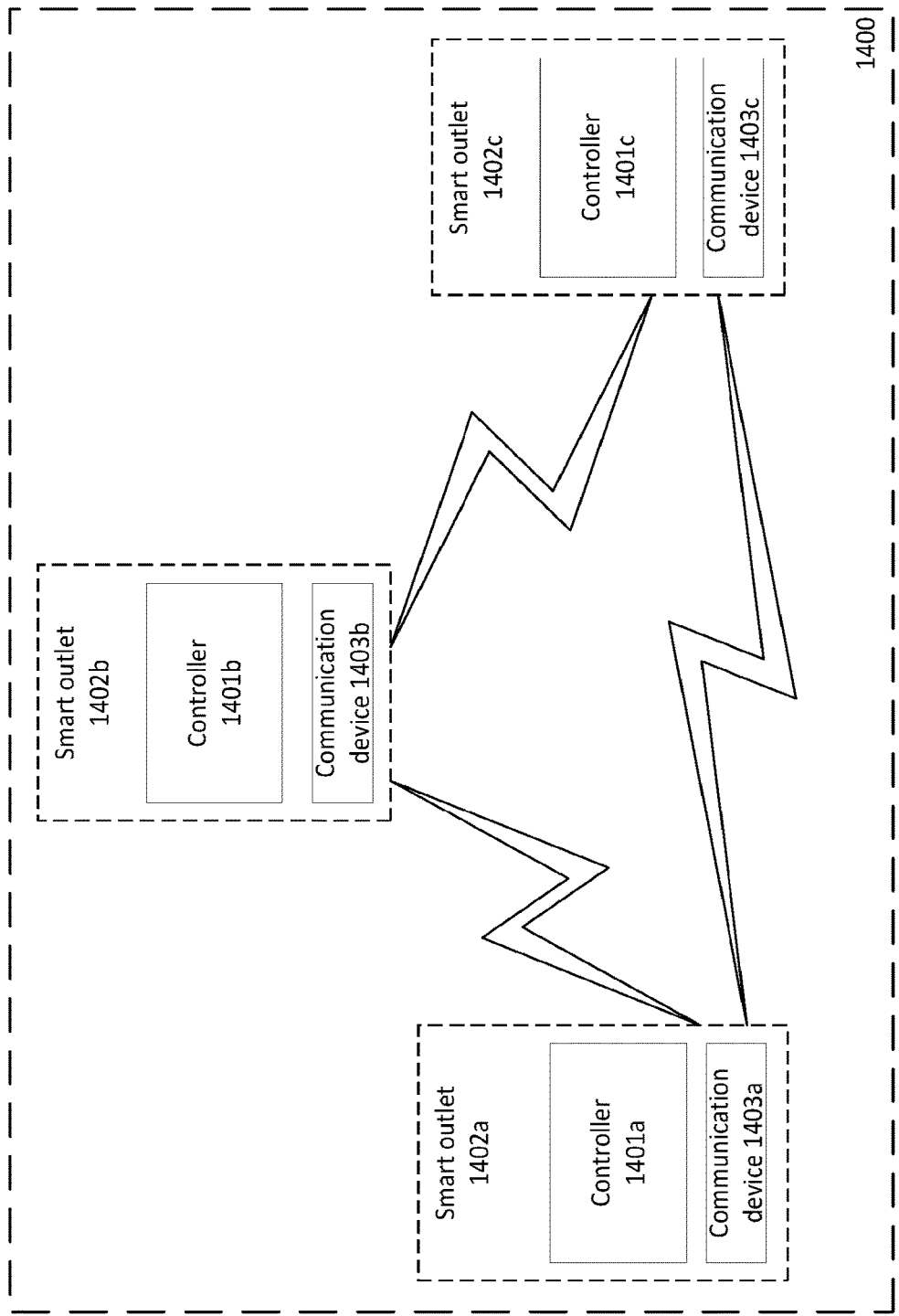
FIG. 14 illustrates communication between controllers according to illustrative features.

Reference is now made to FIG. 14, which illustrates system 1400, a direct wireless connection between the controllers. System 1400 comprises controllers 1401*a*, 1401*b*, and 1401*c*, collectively referred to as controllers 1401, smart outlets 1402*a*, 1402*b*, and 1402*c*, and communication devices 1403*a*, 1403*b*, and 1403*c*, collectively referred to as communication devices 1403. Each of the controllers 1401 and corresponding communication devices 1403 may be associated with a different smart outlet. Controllers 1401 may use communication devices 1403 to send and receive messages to/from other controllers. Communication devices 1403 may directly communicate with each other using wireless communication.

Figure 15:
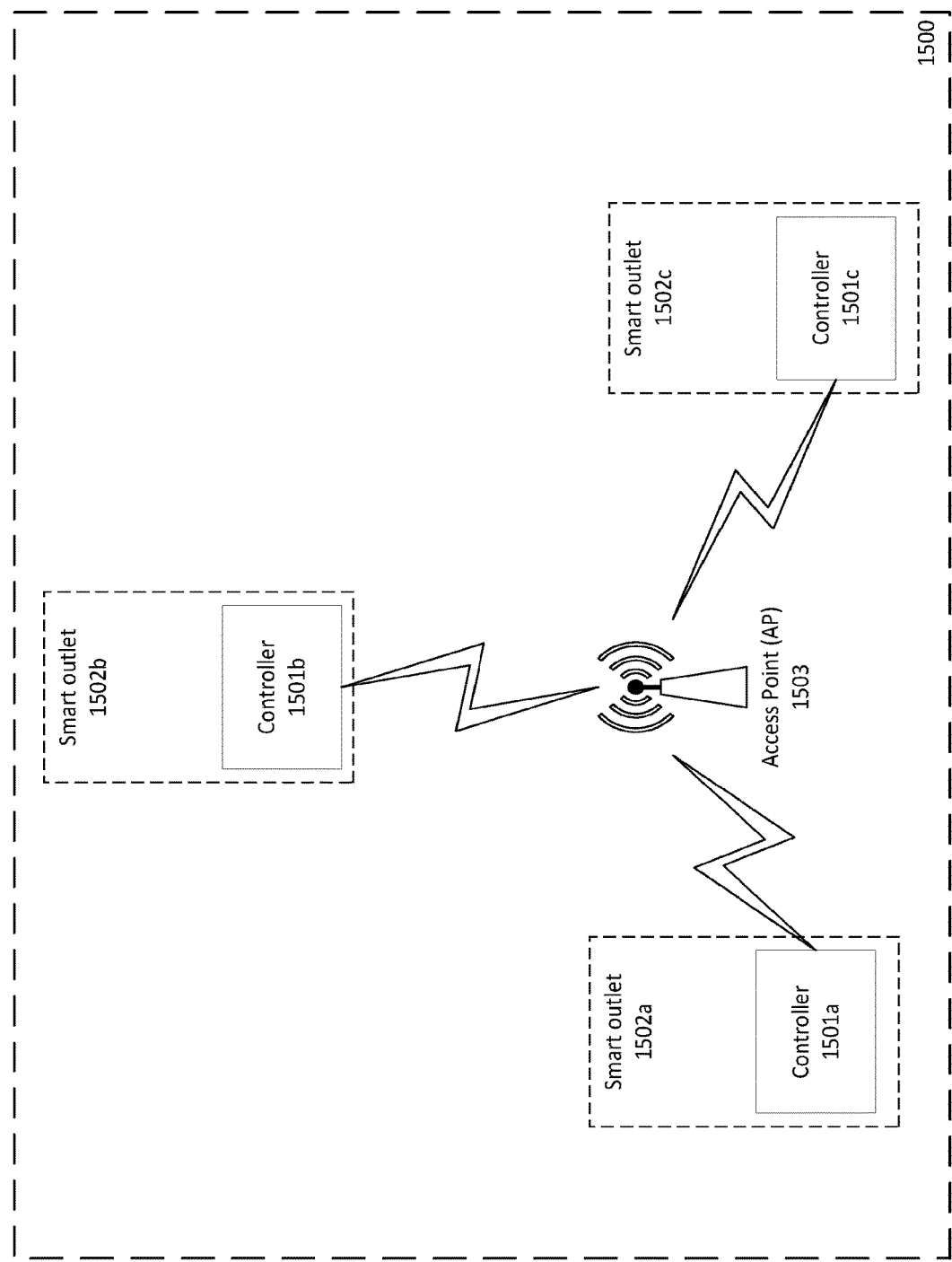
FIG. 15 illustrates communication between controllers according to illustrative features.

FIG. 15 illustrates system 1500, which includes wireless connections between controllers via an access point (AP) 1503. System 1500 comprises AP 1503, controllers 1501*a*, 1501*b*, and 1501*c*, collectively referred to as controllers 1501, and smart outlets 1502*a*, 1502*b*, and 1502*c*. Each of controllers 1501 may be associated with a different smart outlet. Each controller of controllers 1501 may comprise a communication device for sending and receiving information.

Controllers 1501 may communicate with each other via AP 1503 that may serve as a router for messages between controllers 1501. According to features of the disclosure herein, AP 1503 may be integrated in a part of the installment of the system (e.g. integrated in a main controller such as main controller 803 of FIG. 8, or integrated in a converter which may be part of power source 601*b* of FIG. 6). According to features of the disclosure herein, AP 1503 may be a previously deployed AP (e.g. a standard home Wi-Fi™ router).

According to features of the disclosure herein, a controller (e.g. controller(s) 205 of FIG. 2) may consider a multi-objective function comprising the priority switching and the utilization of the power provided by power sources (e.g. power sources 201), wherein the controller may try to satisfy both the priority switching, (i.e. disconnecting low priority loads before higher priority loads), and keeping the power demand as close as possible to the power provided by the power sources. In one example, the power provided by the power sources in a system may be 10 kW. There may be two loads in the system, wherein the first load requires 15 kW and has a high priority label, and the second load requires 1 kW and has a low priority label. According to priority switching that was defined previously, if a priority label of a first load is higher than a priority label of a second load, then the first load may be switched "off" if the second load is switched "off", and the second load may be switched "on" if the first load is switched "on". This may result in zero utilization of the power provided by the power sources. A controller using a multi-objective function may reconnect the low priority load subsequent to disconnecting the high priority load, thus realizing a better utilization of the power provided by the power sources. This may be achieved by adopting an algorithm for solving the knapsack problem (KP). The KP may be described by the following description: given a set of items, each item having a weight and a value, determine a subset of items to include in a collection such that the total weight is less than or equal to a given limit and the total value is maximal. According to features of the disclosure herein, each item may represent a load, its weight may be its power demand and its value may be its priority label value or a function of its priority label. Although this method maximizes the utilization, it may violate the priority switching definition.

According to features of the disclosure herein, a controller may turn "on" or "off" loads, and according to features of the disclosure herein, a controller may use more options that involve turning the load "on" but limiting the amount of power that it may draw. For example a 100 W lamp that may be limited by a controller to draw only 80 watts may produce less light but may still function as a light source. A second example may be an AC unit that may be limited to cool a room down to a certain temperature (e.g. 75 degrees Fahrenheit) this may limit the amount of power the AC unit requires for cooling the room.

According to features of the disclosure herein, an electrical network may be connected to multiple power sources, one of which may be the optional storage device 806 of FIG. 8. A storage device may be one or more batteries, storage capacitors and/or flywheels. During times where the power provided by the power sources (excluding the storage device) is larger than the power required by the loads, the storage device may be charged with the extra power. During times where the power provided by the power sources excluding the storage device is less than the power required by the loads, the storage device may provide additional power by discharging energy. If one of the other power sources in the system is a photovoltaic (PV) system, the storage device may be charged during day time (when there may be a lot of sunlight), and during nighttime, (when the PV system may provide less power), the storage device may provide the power by discharging energy. The information about the power sources in the electrical network may help to predict the likely available power profile. The likely available power profile may help the controller to predict the available power for the loads in the electrical network and decide what loads to turn off, turn on, or limit the amount of power the loads may draw.

For example, a premises may have two power sources (one of which may be a storage device) and only two loads, a medical ventilator machine with a high priority label and an air conditioning unit (A/C unit) with a lower priority label. Even when the two power sources generate enough power to support both loads, the controller may decide to turn the low priority load off or to limit the power supplied to the low priority loaded because the likely available power profile may indicate that there may be limited power soon that might not be enough for any of the loads. By limiting the power supplied to the A/C unit power, the storage device may be charged. Subsequently, at a later point, when there is insufficient power provided by the other power sources, the storage device may provide the extra power needed to keep the medical ventilator machine turned on.

According to features of the disclosure herein, it may be useful to predict the likely available power profile. A likely available power profile may be predicted according to different parameters depending on the power sources that may be connected to the system. One method of acquiring the information may be receiving one or more related manual inputs from a user through a user interface. For example, to predict the power that may be produced by a PV system, it may be useful to know the location of the system. This may be because of the geographic conditions in which a PV system may be installed in and may determine the amount of power produced by the PV system (e.g. a PV system may produce less power in Greenland than an identical or similar system in Egypt). Another method of acquiring the information may include installing relevant sensors that may have the ability to provide the information. For example, instead of receiving a manual input from a user indicating the country in which a PV system is located in, a GPS (or any other satellite navigation system) sensor may provide this information.

Additional information may be provided from a connection to the internet, such as weather and cloud cover. A controller that receives a weather forecast of significant cloud cover may change its prediction of the likely available power profile.

The likely available power profile may also be predicated by collecting measurements of the power profile history. Some methods may provide good predictions based on information from the past. In some scenarios, filter predictors such as linear predictor, moving average (M.A.) predictor, and autoregressive (A.R.) predictor may be sufficient, and in other scenarios some more complex methods that involve machine learning may be implemented. According to features of the disclosure herein, information may be shared between different premises to improve the prediction. Sharing information between different premises may provide certain advantages, some may be reducing measurement errors and compensate defective sensors.

Figure 16:
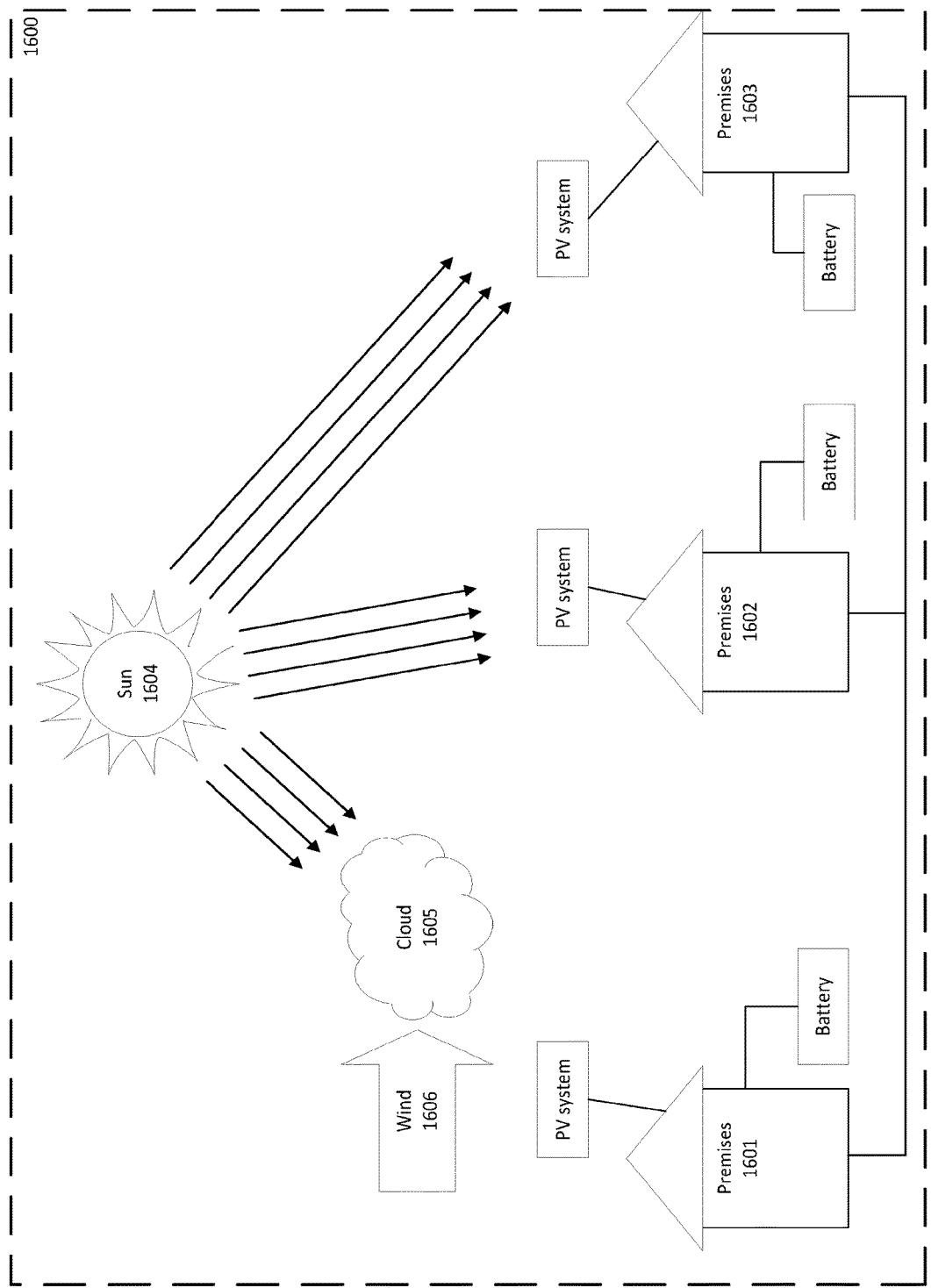
FIG. 16 illustrates an electrical system according to illustrative features.

FIG. 16 illustrates system 1600 which may be an example of using shared information between premises that include a storage device to improve prediction. System 1600 comprises premises 1601, 1602, and 1603, sun 1604, cloud 1605 and wind 1606. Each premises may have a storage device (such as a battery) and a PV system. Initially premises 1601 may be shaded by cloud 1605, so the controller of premises 1601 may notify the controller of premises 1602 and the controller of premises 1603 that premises 1601 is shaded. Subsequently, wind 1606 may cause cloud 1605 to move to the right, thereby causing premises 1602 to be shaded by cloud 1605. The controller of premises 1602 may notify the controller of premises 1601 and the controller of premises 1603 that premises 1602 is now shaded. Based on this information, the controller of premises 1603 may predict that it will be shaded soon, so the controller of premises 1603 may save power by disconnecting low priority loads, and charge its storage device with the saved power. Subsequently, when wind 1606 moves cloud 1605, causing it to shade premises 1603, premises 1603 may provide power for high priority loads from the storage device. It is understood that one of ordinary skill in the art may slightly modify methods disclosed herein by using different filters (M.A., A.R. etc.). Such modified methods are within the scope of the feature disclosed herein.

Another power profile that may be predicted may be the profile of the power required by loads in systems such as system 800 of FIG. 8. Predicting the amount of power that may be required by loads in the future may affect how much power may be used in the present, and how much power may be stored in a storage device for times when there might not be enough power provided by the power sources. Prediction of power that may be required by loads in the future may include analysis of various factors, such as time of day, day of week or month, season, temperature, historical measurements of power required by loads, etc. These factors may affect the amount of available sunlight and/or the amount of power provided and/or the amount of power demand of the loads.

Figure 17:
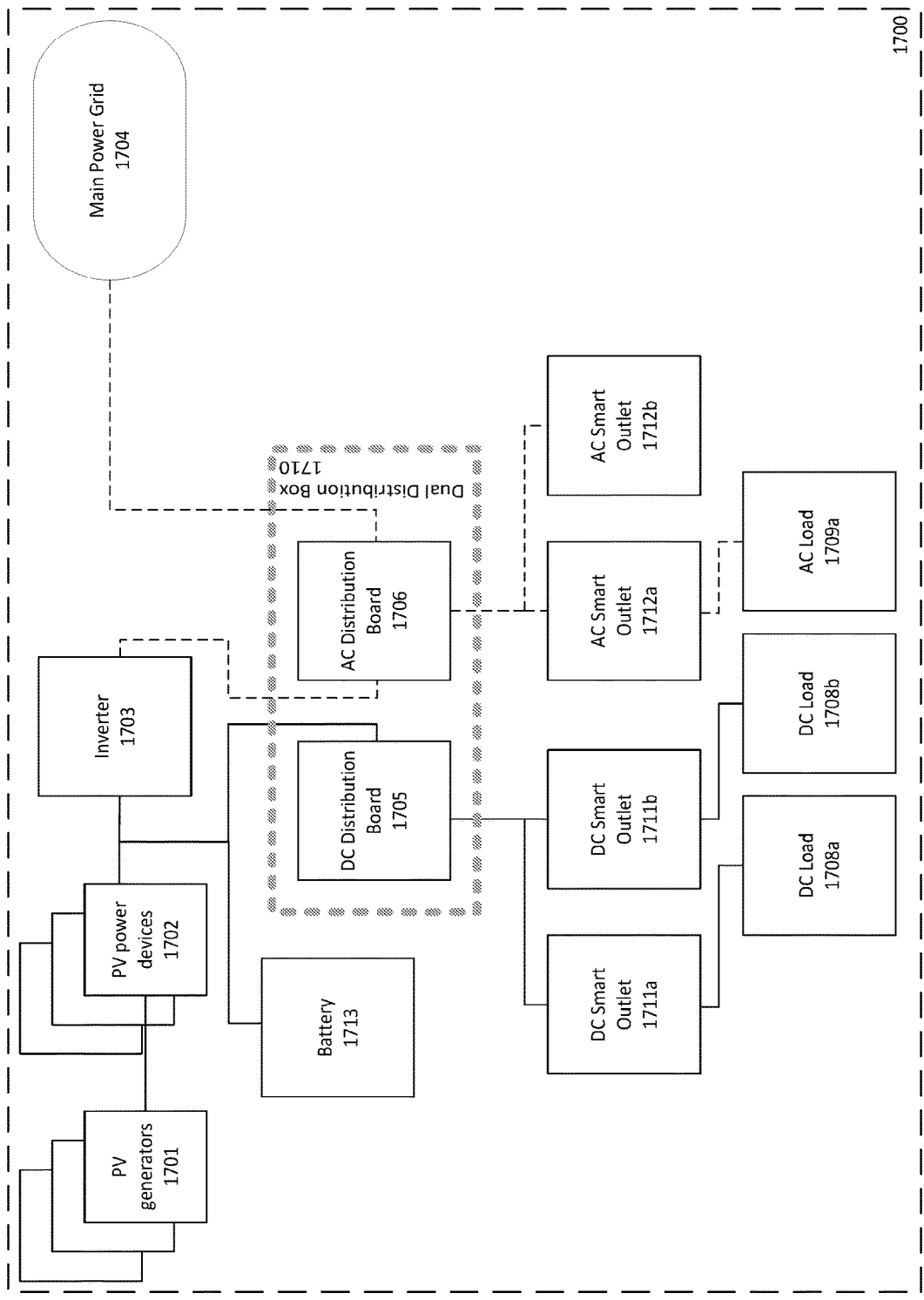
FIG. 17 illustrates a scheme for a dual system according to illustrative features.

Reference is now made to FIG. 17, which illustrates a dual AC-DC system comprising PV generators 1701, PV power devices 1702, converter 1703, main power grid 1704, storage device 1713, dual distribution board 1710 (comprising DC distribution board 1705 and AC distribution board 1706), DC smart outlets 1711a and 1711b (collectively referred to as "DC smart outlets 1711"), AC smart outlets 1712a and 1712b (collectively referred to as "AC smart outlets 1712"), DC loads 1708a and 1708b (collectively referred to as "DC loads 1708"), and AC load 1709a. PV generators 1701 generate DC power that may be transmitted to PV power devices 1702. PV power devices 1702, which may comprise one or more DC-DC converters and may comprise a monitoring device, transfer the power to DC smart outlets 1711 via DC distribution board 1705, and to converter 1703. Any surplus power from PV power devices 1702 may be stored in storage device 1713. Converter 1703 transfers the power received from PV power devices 1702 to AC distribution board 1706. AC distribution board receives power from both PV power devices 1702 and main power grid 1704, and transfers the power to AC smart outlets 1712. Converter 1703 may communicate with PV power devices 1702 in order to control the increasing or decreasing of the power drawn from PV generators 1701, e.g. tracking the maximum power point (MPPT) on the power curve of PV generators 1701 or selecting a different power point to match a signal such as an electrical parameter (e.g. current, voltage and/or temperature), and also may communicate with the smart outlets 1711 and 1712 and/or a smart distribution board which may be installed instead of distribution boards 1705 and 1706. Each smart outlet may be connected to either DC power (received DC distribution board 1705) or AC power (received from AC distribution board 1706). DC only or AC only smart outlets may be realized as illustrated in FIG. 5.

Figure 18:
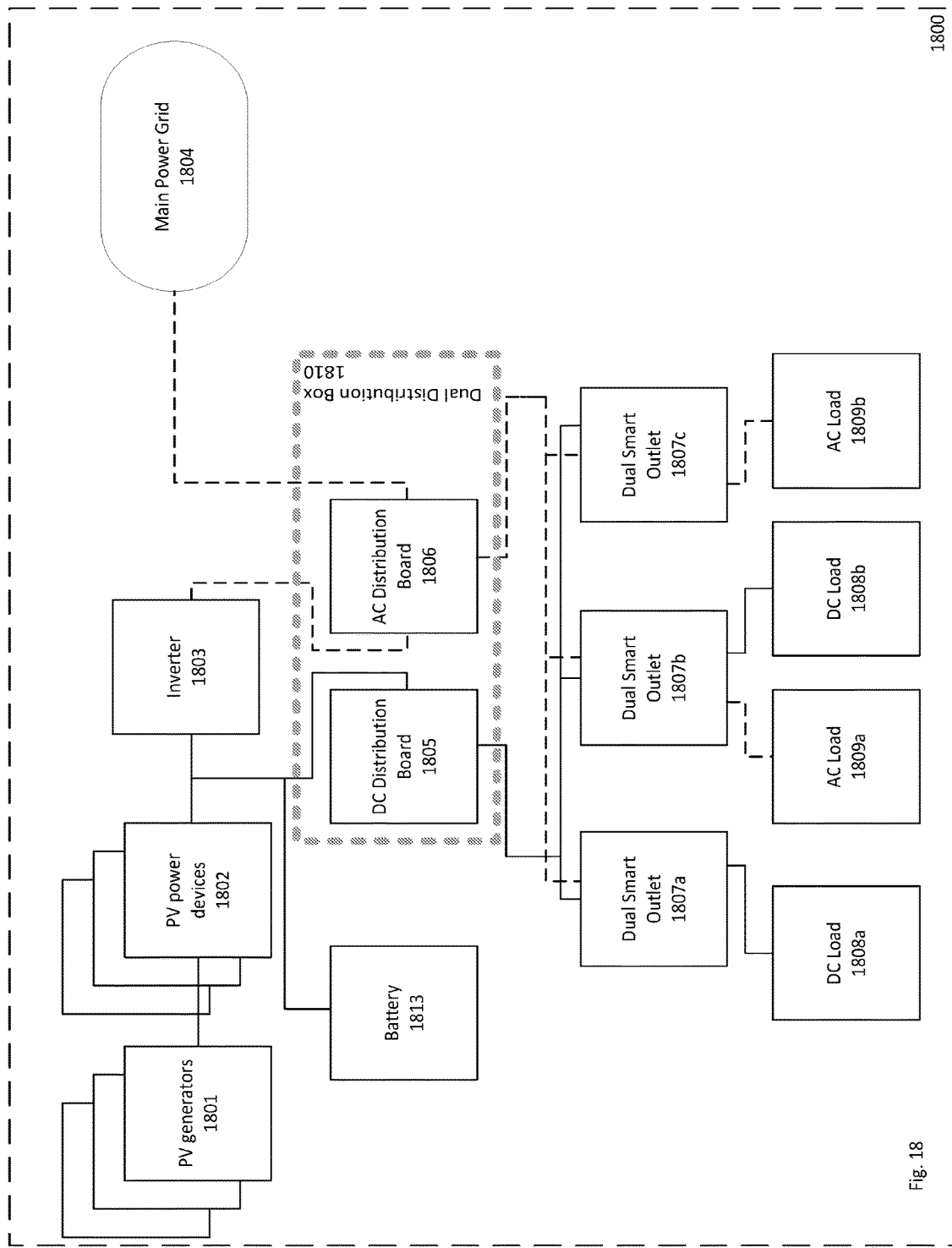
FIG. 18 illustrates a scheme for a dual system according to illustrative features.

FIG. 18 illustrates system 1800b, which may be a dual AC-DC system. The system 1800b comprises PV generators 1801, PV power devices 1802, converter 1803, storage device 1813, main power grid 1804, dual distribution board 1810 (comprising DC distribution board 1805 and AC distribution board 1806), dual smart outlets 1807a, 1807b, and 1807c (collectively referred to as "dual smart outlets 1807"), DC load 1808a and 1808b, and AC load 1809a and 1809b. Each dual smart outlet of the dual smart outlets 1807 may be connected to both AC and DC power lines, and may provide power to both DC loads and AC loads. An example for a dual smart outlet is illustrated in FIG. 19.

Figure 19:
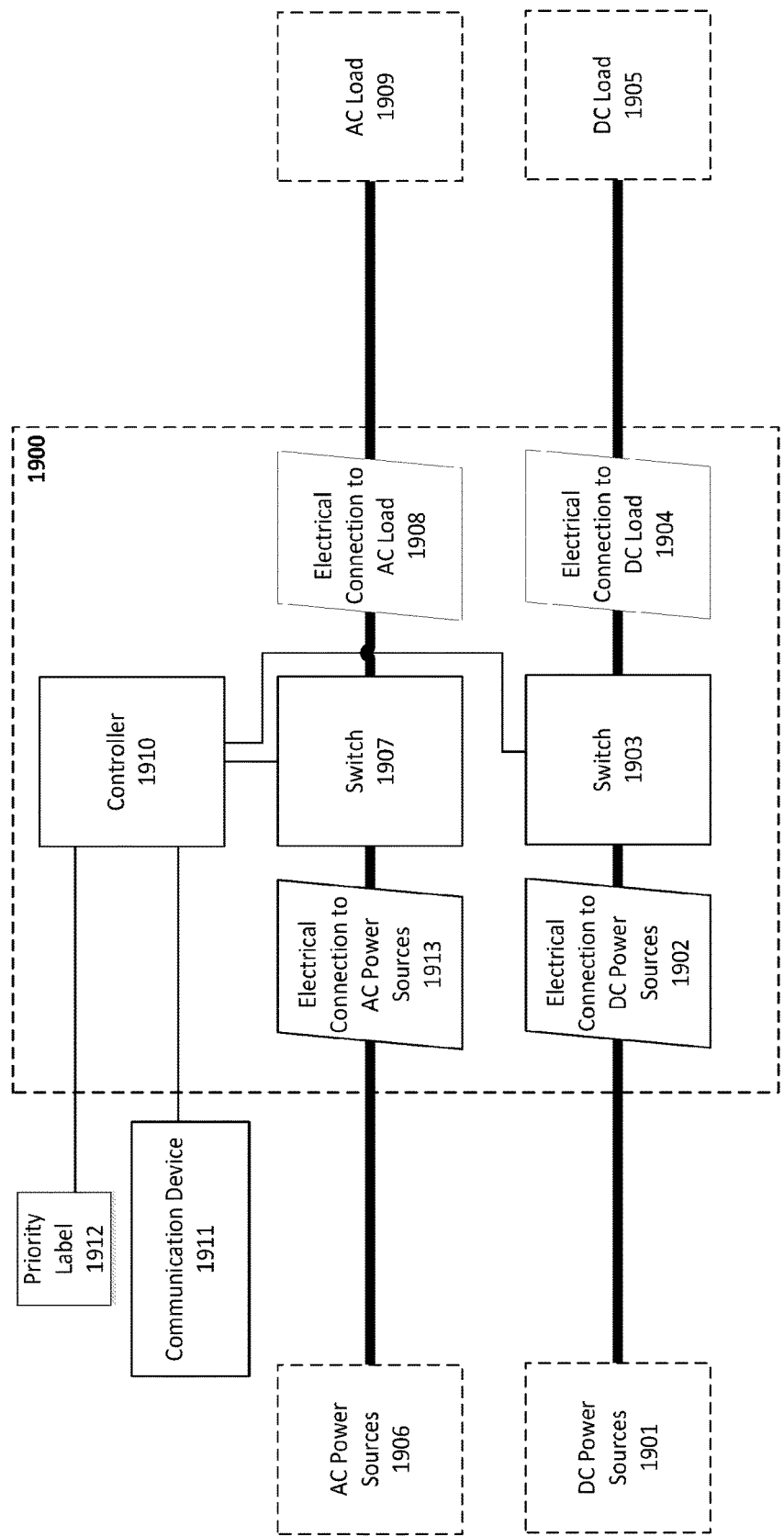
FIG. 19 illustrates a dual smart outlet according to illustrative features.

Reference is now made to FIG. 19, which illustrates a dual AC-DC smart outlet. The illustrated system comprises DC power sources 1901, AC power sources 1906, DC load 1905, AC load 1909, communication device 1911, priority label 1912 and dual smart outlet 1900. Dual smart outlet 1900 may comprise controller 1910, electrical connection to AC power sources 1906, electrical connection to AC load 1908, switch 1907, electrical connection to DC power sources 1901, electrical connection to DC load 1905, and switch 1903. Switch 1903 together with connections 1902 and 1904 may provide a link between DC load 1905 and DC power sources 1901. Switch 1907 together with connections 1913 and 1908 may provide a link between AC load 1909 and AC power sources 1906. Switches 1903 and 1907 may be controlled by controller 1910. Controller 1910 may set the state of switches 1903 and 1907 according to priority label 1912 and according to data that may be received from communication device 1911. Controller 1910 may also transmit data regarding the state of switches 1903 and 1907, and data regarding the power provided by power sources 1901 and 1906 and the power required by loads 1905 and 1909. According to features of the disclosure herein, controller 1910 may also communicate with a smart load (i.e. a load that has a communication device configured to communicate with controller 1910).

Some features may include a Graphical User Interface (GUI) for monitoring and/or controlling an associated electrical system. According to features of the disclosure herein, the GUI may be displayed on a monitor on or near the distribution board, or any other place chosen by the installer. According to features of the disclosure herein, the GUI may be displayed on a PC (e.g. a web application), phone or tablet (e.g. iOS or Android apps). The GUI may be further extended to be able to handle user input (e.g. setting the priority label for each switch, or connecting/disconnecting loads via a mobile app).

Further features may include user interfaces for monitoring load division in some power systems. A system owner or operator may be able to view a list of power sources, loads, and priority labels with a mapping between each load and the priority labels, and may also view information regarding the power supply from the power sources or each power source and the power demand from the loads or each load. According to features of the disclosure herein, the list may be a graphical user interface (GUI) viewable on a computing device, such as a computer monitor, tablet, smart-television, smartphone, or the like. According to features of the disclosure herein, the system operator may be able to manually set the priority label of the loads through the GUI (e.g. by pressing buttons).

Figure 20A:
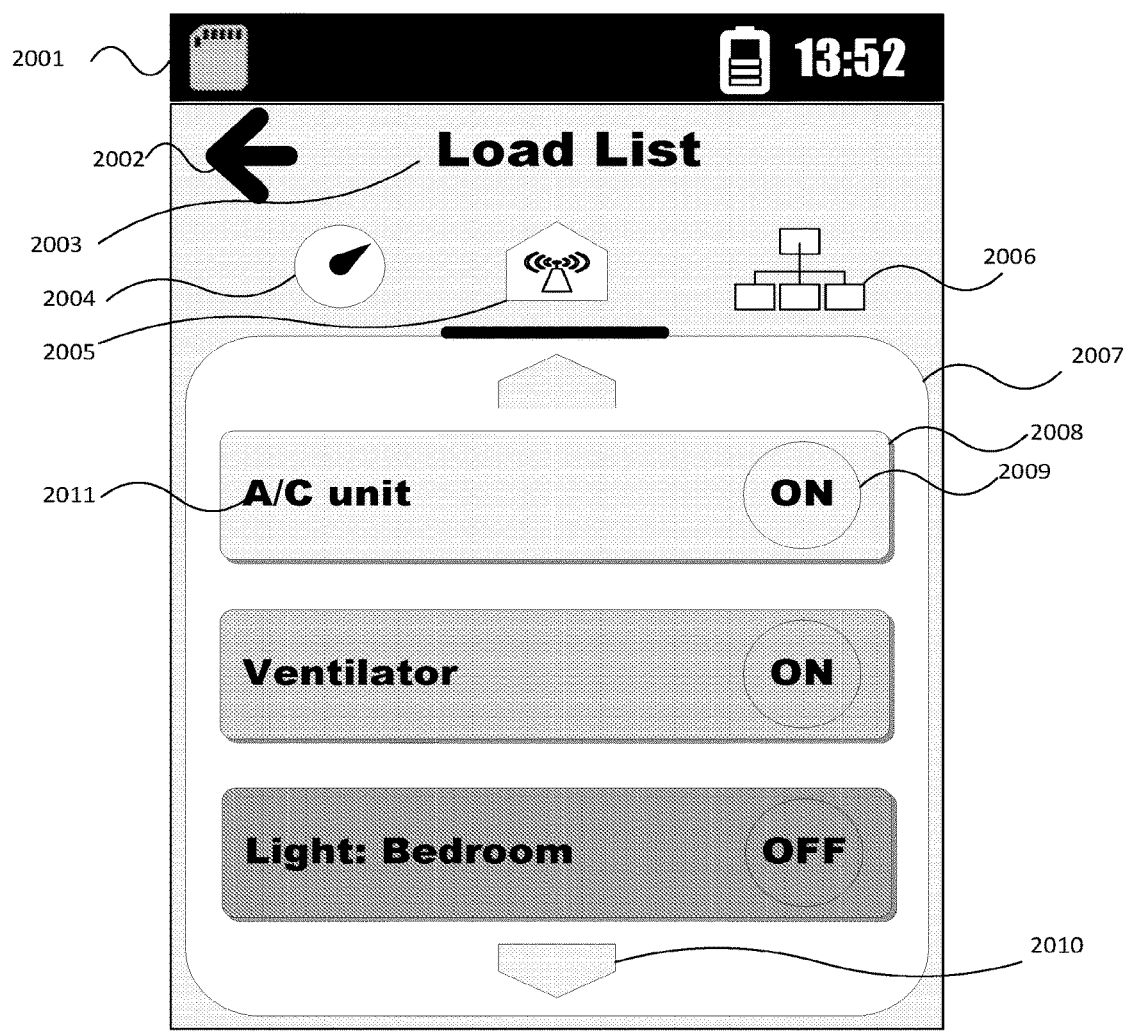
FIG. 20a illustrates an example for a page in a GUI according to illustrative features.

Reference is now made to FIG. 20a which illustrates an example of a page in a GUI application for a touchscreen device such as a tablet, smartphone etc. The page shown in FIG. 20a displays the list of loads in an electrical network. By clicking on a device name on the page a menu may open or the page may change and display the properties that relate to the specific load including the priority label of the load. The user may change the properties of the loads which may include options for setting timers for temporary changes or future changes. On different pages of the application the user may monitor the storage device charge status, the amount of power that may be generated by PV generators (if there are any in the system), the amount of power that may be consumed by the loads, charts and graphs of past data that was collected previously, charts and graphs of the power supply and demand, power supply and demand prediction etc.

Figure 20B:
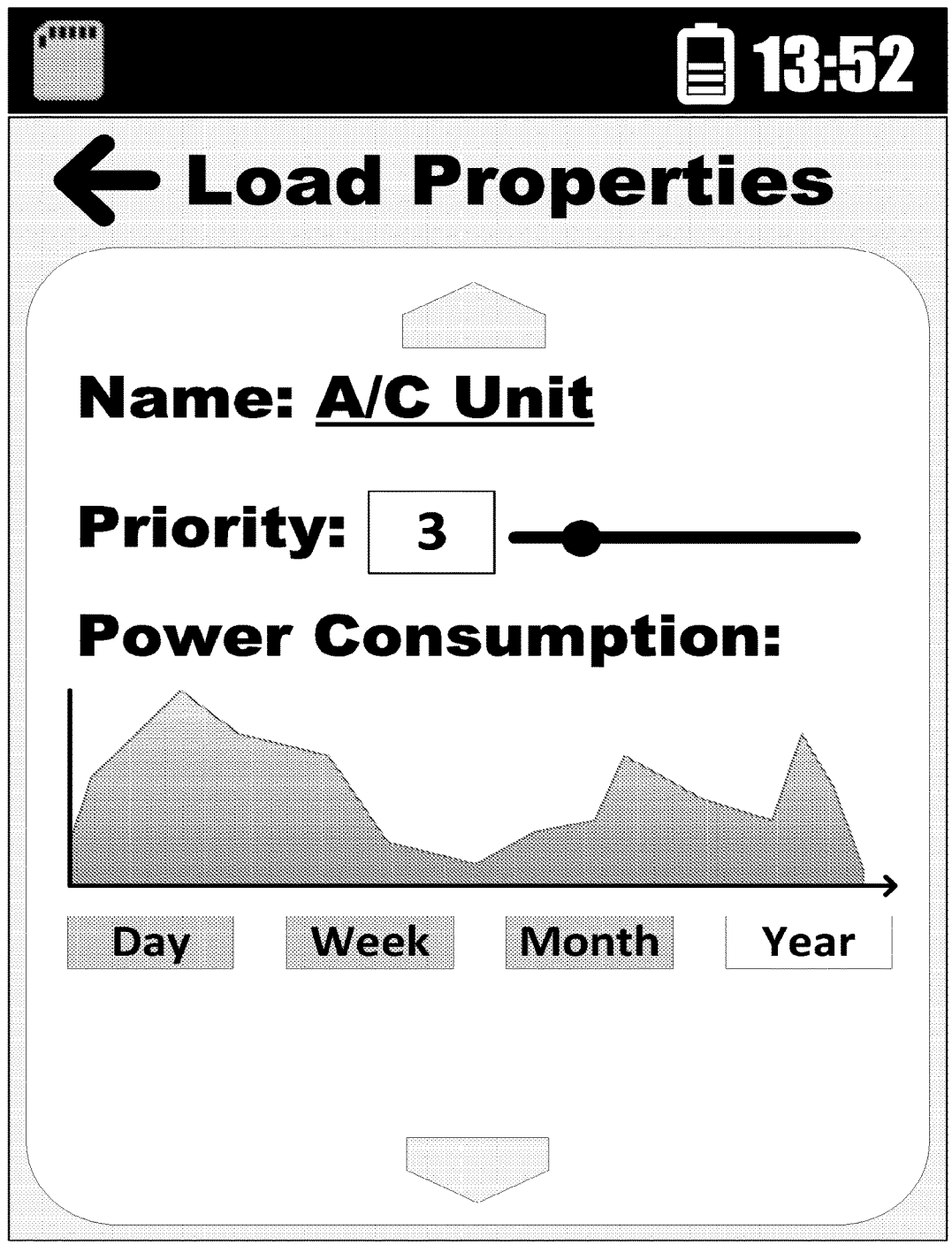
FIG. 20b illustrates an example for a page in a GUI according to illustrative features.

The application may display a page that includes a graphical user interface. The page comprises notification bar 2001, return button 2002 (that when pressed, displays on the screen the previous page), title 2003 (which displays the title of the page), buttons 2004 and 2006 for switching between other pages in the application, an icon 2005 for the current page, load 2011 (the name of a load that may be controlled by a switch e.g. load 504 and switch 502 of FIG. 5), box 2008 (comprising load 2011 on the left and button 2009 on the right). The background color of box 2008 may be set according to the priority label of load 2011, such as priority labels 508 and load 504 of FIG. 5. In one example, higher priority labels may result in a brighter colored background. Button 2009 may show the current state of the switch that controls load 2011, such as switch 502 of FIG. 5. In one instance, pressing of the button 2009 may toggle the state of the switch. When box 2008 is pressed, the page may switch to a page that lists properties of load 2011. An example of a page that lists properties of a load is illustrated in FIG. 20b. The page that displays properties of the chosen load in FIG. 20b allows a user to edit according to the user preference one or more properties of the load (e.g. the load name, the priority label associated with the load, the power demand of the load may be displayed numerically or in a graph where the power demand may be plotted over time interval selected by the user (day, week, month or year)). For example, the page shown in FIG. 20b may include one or more controls that allow a user to edit one or more properties of the load.

Reference is now made to FIG. 21a which illustrates a dual AC-DC smart outlet 2110 such as Dual Smart Outlet 1807a of FIG. 18. The smart outlet comprises three different connections to loads: two AC connections 2101 and 2103 and a single DC connection 2102 configured to connect to a male USB type "A" connector. Similarly FIG. 21b illustrates a dual AC-DC smart outlet 2120 such as Dual Smart Outlet 1807a of FIG. 18, wherein the smart outlet comprises two connections to loads: a single AC connection 2105 and a single DC connection 2104 configured to connect to a male DC connector. The DC connectors in FIG. 21a and FIG. 21b may be replaced by any other DC connector.

Figure 22:
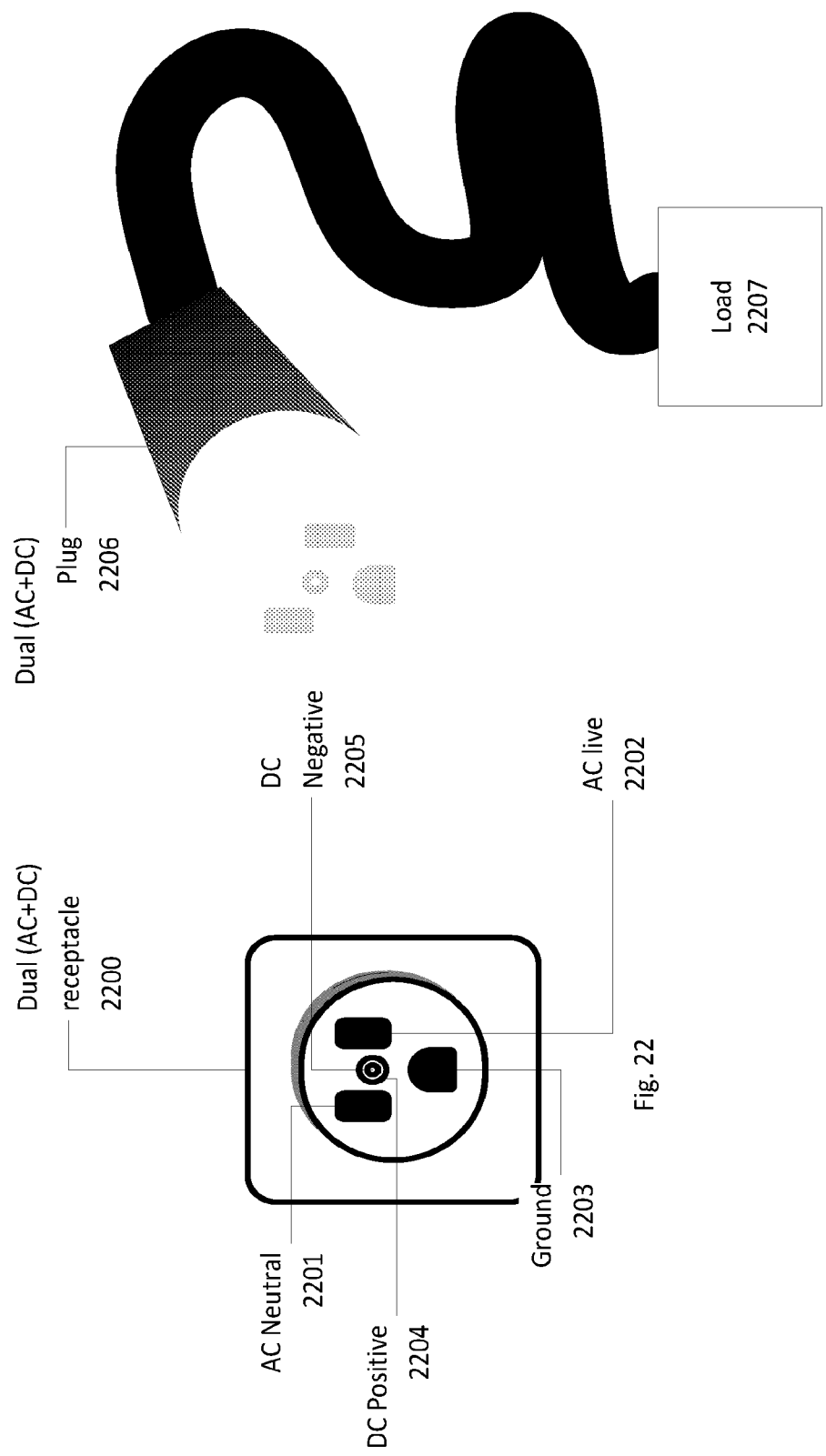
FIG. 22 illustrates an example for a design of a dual smart outlet according to illustrative features.

Reference is now made to FIG. 22 which illustrates a dual AC-DC smart outlet (such as Dual Smart Outlet 1807a of FIG. 18) comprising a connection to a DC load and/or a DC load. The connection comprises two parts: an AC connection comprising 3 connections: neutral 2201, live 2202 and ground 2203, and a DC connection comprising two connections: DC positive 2204 terminal and DC negative terminal 2205. The smart outlet comprises a single connection to a load, configured to connect to a dual AC-DC plug 2206, an AC plug, or a DC plug. The DC part of the connection to a load may be designed to connect to a common coaxial power connector, or to any other DC connection that may be consistent for both the plug and the socket.

It is noted that various connections are set forth between elements herein. These connections are described in general and, unless specified otherwise, may be direct or indirect; this specification is not intended to be limiting in this respect. Further, elements of one aspect of the disclosure may be combined with elements from other aspects in appropriate combinations or subcombinations. For example, the system for inter-controller communication illustrated in FIG. 13 may be combined with the electrical network of FIG. 8 and/or the control methods of FIGS. 3b and 4. As another example, the rotary switch of FIG. 5a may be used to set the priority of smart outlets 602a-602n of FIG. 6 and/or of smart outlets 1402a-1402c of FIG. 14. These examples are for illustrative purposes and are non-limiting (i.e., other combinations may be made).

What is claimed is:

1. An apparatus comprising:
a casing configured to be mounted on or in a surface in a premises;
a first electrical connection configured to connect to one or more loads;
a second electrical connection configured to connect to one or more power sources via a power line, wherein the second electrical connection is connected to power lines that are on or in the surface;
a first switch linking the first electrical connection and the second electrical connection;
a first priority label associated with the one or more loads;
a first communication device configured to communicate with a main controller; and
a secondary controller, wherein the secondary controller is configured to control the first switch based on the first priority label and instructions received from the main controller,
wherein the first electrical connection, the second electrical connection, the first switch, and the main controller are enclosed in the casing.

2. The apparatus of claim 1, wherein the main controller and the first switch are placed next to a distribution board controlling electrical power to a premises.

3. The apparatus of claim 1, wherein the secondary controller is configured to measure or receive a power demand value associated with the one or more loads.

4. The apparatus of claim 1, wherein the secondary controller is configured to receive information from the main controller using the first communication device, process the information with regard to the first priority label, and control the first switch based on the processed information.

5. The apparatus of claim 1, wherein the first communication device configured to communicate with the main controller via a power line.

6. The apparatus of claim 5, wherein the power line carries an alternating current comprising a frequency and an amplitude, and wherein the first communication device is configured to detect a change of one or more of the amplitude and the frequency of the alternating current.

7. The apparatus of claim 1, wherein the first communication device is further configured to communicate with a second apparatus comprising:
a third electrical connection configured to connect to one or more second loads;
a forth electrical connection configured to connect to one or more power sources;
a second switch linking the first electrical connection and the second electrical connection;
a second priority label associated with the one or more second loads;
a second communication device configured to communicate with the main controller; and
a third controller, wherein the third controller is configured to control the second switch based on the second priority label,
wherein the apparatus and the second apparatus are configured to connect to an electrical network.

8. The apparatus of claim 1, wherein the one or more power sources comprise a photovoltaic power source.

9. The apparatus of claim 1, wherein the one or more power sources comprise a utility grid.

10. The apparatus of claim 1, wherein the secondary controller is further configured to:
receive an available power value provided by a power source of the one or more power sources;
compare the available power value with a record of a previous power value provided by the power source;
measure a power demand of the one or more loads receiving power from the power source; and
responsive to a determination that one or more of the disconnected loads can be reconnected without the power demand exceeding a second threshold, signal one or more smart outlets to reconnect one or more of the disconnected loads.

11. An apparatus comprising:
a first electrical connection configured to connect to one or more loads;
a second electrical connection configured to connect to one or more power sources via a power line,
a first switch linking the first electrical connection and the second electrical connection;
a first priority label associated with the one or more loads; and
a first communication device configured to communicate with a main controller,
wherein the first switch is configured to be controlled by the main controller based on the first priority label, wherein the first electrical connection, the second electrical connection, the first switch, and the first communication device are enclosed in a casing designed to be mounted on or in a surface in a premises, and wherein the second electrical connection is connected to power lines that are on or in the surface.

12. A system comprising:
an electrical network comprising one or more power sources;
a main controller;
a first apparatus comprising:
   a first electrical connection configured to connect to one or more first loads;
   a second electrical connection configured to connect to the electrical network via a first Rower line;
   a first switch linking the first electrical connection and the second electrical connection;
   a first priority label associated with the one or more first loads; and
   a first communication device configured to communicate with the main controller,
   wherein the first switch is configured to be controlled by the main controller based on the first priority label;
a second apparatus comprising:
   a third electrical connection configured to connect to one or more second loads;
   a fourth electrical connection configured to connect to the to the electrical network via a second power line;
   a second switch linking the first electrical connection and the second electrical connection;
   a second priority label associated with the one or more second loads; and
   a second communication device configured to communicate with the main controller,
   wherein the second switch is configured to be controlled by the main controller based on the second priority label.

* * * * *